US009757695B2

(12) United States Patent
Lask et al.

(10) Patent No.: US 9,757,695 B2
(45) Date of Patent: Sep. 12, 2017

(54) ANTI-SCALE ELECTROCHEMICAL APPARATUS WITH WATER-SPLITTING ION EXCHANGE MEMBRANE

(71) Applicant: PIONETICS CORPORATION, San Carlos, CA (US)

(72) Inventors: Mauricio Lask, San Francisco, CA (US); Dennis Menchung Kwok, San Mateo, CA (US); Eric David Nyberg, San Carlos, CA (US); Stephen Leroy Tondre, Fremont, CA (US)

(73) Assignee: PIONETICS CORPORATION, San Carlos, CA (US)

( * ) Notice: Subject to any disclaimer, the term of this patent is extended or adjusted under 35 U.S.C. 154(b) by 0 days.

(21) Appl. No.: 14/983,451

(22) Filed: Dec. 29, 2015

(65) Prior Publication Data

US 2016/0194225 A1 Jul. 7, 2016

Related U.S. Application Data

(60) Provisional application No. 62/099,447, filed on Jan. 3, 2015.

(51) Int. Cl.
*C02F 1/46* (2006.01)
*B01D 69/04* (2006.01)
(Continued)

(52) U.S. Cl.
CPC ............ *B01D 69/04* (2013.01); *C02F 1/4602* (2013.01); *C02F 1/4693* (2013.01); *C02F 5/086* (2013.01);
(Continued)

(58) Field of Classification Search
CPC ...... C02F 1/4693; C02F 1/4602; C02F 5/086; C02F 5/10; C02F 2201/46115; C02F 2209/40; C02F 2303/22; B01D 69/04
See application file for complete search history.

(56) References Cited

U.S. PATENT DOCUMENTS 2,470,741 A   5/1949   Gordon
2,726,356 A   12/1955  Rockafellow
(Continued)

FOREIGN PATENT DOCUMENTS

CA   2228886        8/1999
DE   3926642 A1    3/1990
(Continued)

OTHER PUBLICATIONS

T. Liebig, PCT/US2004/024724 International Search Report and Written Opinion, Jun. 12, 2004.
(Continued)

*Primary Examiner* — Arun S Phasge
(74) *Attorney, Agent, or Firm* — Ashok K. Janah; Janah & Associate, P.C.

(57) ABSTRACT

An anti-scale electrochemical apparatus comprises at least one ion exchange cell, each cell comprising a housing having a plurality of openings to receive and release a water stream, inner and outer electrodes in the housing, and a water-splitting membrane between the inner and outer electrodes to treat an influent water stream to form an effluent water stream. A controlled-release scale-inhibitor composite comprising a scale-inhibitor agent and a polymer, is provided in the housing or in the water flow pathway of the electrochemical apparatus. An anti-scale, water splitting ion exchange membrane was also fabricated.

27 Claims, 8 Drawing Sheets

(51) Int. Cl.
*C02F 1/469* (2006.01)
*C02F 5/08* (2006.01)
*C02F 5/10* (2006.01)

(52) U.S. Cl.
CPC ........ *C02F 5/10* (2013.01); *C02F 2201/46115* (2013.01); *C02F 2209/40* (2013.01); *C02F 2303/22* (2013.01)

(56) References Cited

U.S. PATENT DOCUMENTS

| | | |
|---|---|---|
| 2,974,681 A | 7/1957 | Whitehurst |
| 2,825,666 A | 3/1958 | Stoddard |
| 2,829,095 A | 4/1958 | Oda et al. |
| 2,863,813 A | 12/1958 | Juda et al. |
| 3,003,940 A | 10/1961 | Mason et al. |
| 3,233,732 A | 2/1966 | Lung et al. |
| 3,250,695 A | 5/1966 | Winslow, Jr. et al. |
| 3,398,069 A | 8/1968 | Juda |
| 3,398,091 A | 8/1968 | Greatorex |
| 3,412,006 A | 11/1968 | Alexander |
| 3,420,773 A | 1/1969 | Selmeczi |
| 3,433,726 A | 3/1969 | Mcgriff |
| 3,440,149 A | 4/1969 | Parsi |
| 3,440,159 A | 4/1969 | Katz |
| 3,446,724 A | 5/1969 | Lucas |
| 3,454,472 A | 7/1969 | Giuffrida |
| 3,475,122 A | 10/1969 | Brown |
| 3,480,495 A | 11/1969 | Alexander |
| 3,485,576 A | 12/1969 | Goldstein |
| 3,496,091 A | 2/1970 | Mcgriff |
| 3,496,453 A | 2/1970 | Swain |
| 3,518,174 A | 6/1970 | Inoue |
| 3,520,803 A | 7/1970 | Iaconelli |
| 3,523,880 A | 8/1970 | Parsi |
| 3,525,682 A | 8/1970 | Katz |
| 3,542,205 A | 11/1970 | O'cheskey |
| 3,547,801 A | 12/1970 | Albright |
| 3,554,895 A | 1/1971 | Brown |
| 3,558,279 A | 1/1971 | Leitz |
| 3,562,139 A | 2/1971 | Leitz |
| 3,567,864 A | 3/1971 | Palmer |
| 3,589,999 A | 6/1971 | Katz |
| 3,607,417 A | 9/1971 | McRae et al. |
| 3,607,706 A | 9/1971 | Eisenmann |
| 3,608,610 A | 9/1971 | Greatorex |
| 3,627,133 A | 12/1971 | Rak |
| 3,645,882 A | 2/1972 | Parsi |
| 3,645,884 A | 2/1972 | Gilliland |
| 3,654,103 A | 4/1972 | Mcrae |
| 3,654,125 A | 4/1972 | Leitz |
| 3,657,104 A | 4/1972 | Hodgdon, Jr. |
| 3,661,647 A | 5/1972 | Humphrey |
| 3,661,762 A | 5/1972 | Gilliland |
| 3,663,299 A | 5/1972 | Owens |
| 3,664,832 A | 5/1972 | Leitz et al. |
| 3,669,857 A | 6/1972 | Arnold |
| 3,672,841 A | 6/1972 | Freeman, Jr. |
| 3,675,041 A | 7/1972 | Elliott |
| 3,695,444 A | 10/1972 | Iaconelli |
| 3,695,446 A | 10/1972 | Lyall |
| 3,700,934 A | 10/1972 | Swain |
| 3,701,360 A | 10/1972 | Morrison |
| 3,738,812 A | 6/1973 | Berry |
| 3,749,655 A | 7/1973 | Hodgdon |
| 3,772,189 A | 11/1973 | Husseini |
| 3,774,763 A | 11/1973 | Bennett |
| 3,785,954 A | 1/1974 | Herbert |
| 3,787,339 A | 1/1974 | Hodgdon |
| 3,814,688 A | 6/1974 | Hirs |
| 3,827,564 A | 8/1974 | Rak |
| 3,840,341 A | 10/1974 | Rogers |
| 3,843,523 A | 10/1974 | Dresen |
| 3,847,765 A | 11/1974 | Uno |
| 3,850,797 A | 11/1974 | Lyall |
| 3,869,376 A | 3/1975 | Tejeda |
| 3,883,383 A | 5/1975 | Leitz, Jr. |
| 3,887,499 A | 6/1975 | Hodgdon, Jr. |
| 3,896,015 A | 7/1975 | Mcrae |
| 3,926,071 A | 12/1975 | Elliott |
| 3,926,864 A | 12/1975 | Hodgdon, Jr. |
| 3,954,592 A | 5/1976 | Horvath |
| 3,958,960 A | 5/1976 | Bakke |
| 3,958,961 A | 5/1976 | Leitz, Jr. |
| 3,964,985 A | 6/1976 | Giuffrida |
| 3,993,517 A | 11/1976 | Schneider |
| 4,012,310 A | 3/1977 | Clark |
| 4,024,043 A | 5/1977 | Dege |
| 4,032,452 A | 6/1977 | Davis |
| 4,057,483 A | 11/1977 | Giuffrida |
| 4,062,756 A | 12/1977 | Jha |
| 4,074,983 A | 2/1978 | Dege et al. |
| 4,140,591 A | 2/1979 | Fong |
| 4,148,708 A | 4/1979 | Grant |
| 4,173,524 A | 11/1979 | McRae |
| 4,191,811 A | 3/1980 | Hodgdon |
| 4,202,772 A | 5/1980 | Goldstein |
| 4,216,073 A | 8/1980 | Goldstein |
| 4,217,186 A | 8/1980 | McRae |
| 4,225,412 A | 9/1980 | Reiss |
| 4,230,544 A | 10/1980 | McRae |
| 4,231,855 A | 11/1980 | Batchelder |
| 4,242,185 A | 12/1980 | McRae |
| 4,255,012 A | 3/1981 | Parent |
| 4,257,887 A | 3/1981 | Rak |
| 4,270,935 A | 6/1981 | Reinauer |
| 4,275,227 A | 6/1981 | MacDonald |
| 4,276,140 A | 6/1981 | Jain |
| 4,284,492 A | 8/1981 | Karn |
| 4,298,442 A | 11/1981 | Giuffrida |
| 4,299,677 A | 11/1981 | Venkatasubramanian |
| 4,299,698 A | 11/1981 | Rak |
| 4,310,631 A | 1/1982 | MacDonald |
| 4,373,031 A | 2/1983 | Waite |
| 4,374,206 A | 2/1983 | MacDonald |
| 4,374,720 A | 2/1983 | MacDonald |
| 4,381,232 A | 4/1983 | Brown et al. |
| 4,391,680 A | 7/1983 | Mani |
| 4,396,477 A | 8/1983 | Jain |
| 4,426,323 A | 1/1984 | Jain |
| 4,435,318 A | 3/1984 | Pabst |
| 4,441,978 A | 4/1984 | Jain |
| 4,461,693 A | 7/1984 | Jain |
| 4,465,573 A | 8/1984 | O'Hare |
| 4,504,373 A | 3/1985 | Mani |
| 4,505,797 A | 3/1985 | Hodgdon |
| 4,534,867 A | 8/1985 | Kreusch |
| 4,536,845 A | 8/1985 | DeVale |
| 4,584,075 A | 4/1986 | Goldstein |
| 4,587,269 A | 5/1986 | Thomas, Jr. |
| 4,592,817 A | 6/1986 | Chlanda |
| 4,594,135 A | 6/1986 | Goldstein |
| 4,606,943 A | 8/1986 | Rak |
| 4,608,140 A | 8/1986 | Goldstein |
| 4,614,576 A | 9/1986 | Goldstein |
| 4,617,321 A | 10/1986 | MacDonald |
| 4,632,745 A | 12/1986 | Giuffrida |
| 4,636,289 A | 1/1987 | Mani |
| 4,643,814 A | 2/1987 | Goldstein |
| 4,645,625 A | 2/1987 | Lundstrom |
| 4,661,224 A | 4/1987 | Goldstein |
| 4,663,144 A | 5/1987 | McQuillan |
| 4,668,402 A | 5/1987 | Norton |
| 4,671,863 A | 6/1987 | Tejeda |
| 4,673,483 A | 6/1987 | Mandle |
| 4,678,565 A | 7/1987 | Norton |
| 4,707,240 A | 11/1987 | Parsi |
| 4,731,049 A | 3/1988 | Parsi |
| 4,735,717 A | 4/1988 | Sims |
| 4,750,983 A | 6/1988 | Foster |
| 4,769,135 A | 9/1988 | Norton |
| 4,775,703 A | 10/1988 | Susa |
| 4,781,809 A | 11/1988 | Falcone, Jr. |
| 4,795,537 A | 1/1989 | Timewell |

(56) References Cited

U.S. PATENT DOCUMENTS

| | | |
|---|---|---|
| 4,802,984 A | 2/1989 | Waite |
| 4,804,451 A | 2/1989 | Palmer |
| 4,806,291 A | 2/1989 | Susa |
| 4,822,471 A | 4/1989 | MacDonald |
| 4,851,100 A | 7/1989 | Hodgdon |
| 4,864,229 A | 9/1989 | Lauks |
| 4,871,431 A | 10/1989 | Parsi |
| 4,888,098 A | 12/1989 | Nyberg |
| 4,900,450 A | 2/1990 | Schmidt |
| 4,913,816 A | 4/1990 | Waite |
| 4,925,541 A | 5/1990 | Giuffrida |
| 4,940,667 A | 7/1990 | Goldstein |
| 4,969,983 A | 11/1990 | Parsi |
| 4,977,094 A | 12/1990 | Goldstein |
| 4,980,056 A | 12/1990 | Norton |
| 4,990,230 A | 2/1991 | Voss |
| 5,006,211 A | 4/1991 | Paleologou |
| 5,007,989 A | 4/1991 | Nyberg |
| 5,019,235 A | 5/1991 | Nyberg |
| 5,026,465 A | 6/1991 | Katz |
| 5,037,858 A | 8/1991 | MacDonald |
| 5,045,171 A | 9/1991 | MacDonald |
| 5,045,198 A | 9/1991 | Norton |
| 5,055,170 A | 10/1991 | Saito |
| 5,056,996 A | 10/1991 | Papastavros |
| 5,061,372 A | 10/1991 | Rak |
| 5,066,375 A | 11/1991 | Parsi |
| 5,066,393 A | 11/1991 | Padera |
| 5,073,255 A | 12/1991 | Chili |
| 5,075,011 A | 12/1991 | Waite |
| 5,089,192 A | 2/1992 | Costa |
| 5,102,547 A | 4/1992 | Waite |
| 5,118,424 A | 6/1992 | McRae |
| 5,118,717 A | 6/1992 | Hodgdon |
| 5,120,416 A | 6/1992 | Parsi |
| 5,137,925 A | 8/1992 | Hodgdon |
| 5,141,717 A | 8/1992 | McRae |
| 5,145,618 A | 9/1992 | MacDonald |
| 5,147,553 A | 9/1992 | Waite |
| 5,152,901 A | 10/1992 | Hodgdon |
| 5,160,608 A | 11/1992 | Norton |
| 5,194,189 A | 3/1993 | Papastavros |
| 5,203,976 A | 4/1993 | Parsi |
| 5,203,982 A | 4/1993 | MacDonald |
| 5,221,455 A | 6/1993 | Hanada |
| 5,227,052 A | 7/1993 | Ilves |
| 5,228,962 A | 7/1993 | Mani |
| 5,264,125 A | 11/1993 | MacDonald |
| 5,273,070 A | 12/1993 | Chili |
| 5,281,317 A | 1/1994 | Mani |
| 5,282,935 A | 2/1994 | Cawlfield |
| 5,284,879 A | 2/1994 | Hodgdon |
| 5,308,466 A | 5/1994 | Ganzi |
| 5,322,604 A | 6/1994 | Cawlfield |
| 5,354,903 A | 10/1994 | MacDonald |
| 5,401,408 A | 3/1995 | Umemura |
| 5,415,759 A | 5/1995 | Cawlfield |
| 5,480,555 A | 1/1996 | Momber |
| 5,503,729 A | 4/1996 | Elyanow |
| 5,510,394 A | 4/1996 | Hodgdon |
| 5,558,753 A | 9/1996 | Gallagher |
| 5,616,249 A | 4/1997 | Hodgdon |
| 5,665,239 A | 9/1997 | Katzakian, Jr. |
| 5,670,055 A | 9/1997 | Yu |
| 5,679,228 A | 10/1997 | Elyanow |
| 5,679,229 A | 10/1997 | Goldstein |
| 5,693,227 A | 12/1997 | Costa |
| 5,699,272 A | 12/1997 | Zabinski |
| 5,702,582 A | 12/1997 | Goldstein |
| 5,751,598 A | 5/1998 | Zabinski |
| 5,762,774 A | 6/1998 | Tessier |
| 5,766,488 A | 6/1998 | Uban |
| 5,770,037 A | 6/1998 | Goto |
| 5,788,826 A | 8/1998 | Nyberg |
| 5,792,360 A * | 8/1998 | Algar ................ B01F 1/0027 210/198.1 |
| 5,798,040 A | 8/1998 | Liang |
| 5,814,197 A | 9/1998 | Batchelder |
| 5,833,846 A | 11/1998 | Tanabe |
| 5,858,191 A | 1/1999 | DiMascio |
| 5,863,438 A | 1/1999 | Katzakian |
| 5,868,915 A | 2/1999 | Ganzi |
| 5,888,381 A | 3/1999 | Primdahl |
| 5,891,328 A | 4/1999 | Goldstein |
| 5,895,570 A | 4/1999 | Liang |
| 5,897,757 A | 4/1999 | Sano |
| 5,919,357 A | 7/1999 | Wilkins |
| 5,922,209 A | 7/1999 | Yoshida |
| 5,925,240 A | 7/1999 | Wilkins |
| 5,948,230 A | 9/1999 | McRae |
| 5,958,213 A | 9/1999 | Goto |
| 6,032,821 A | 3/2000 | Martin |
| 6,047,768 A | 4/2000 | Buehler, III |
| 6,074,551 A | 6/2000 | Jones |
| 6,080,323 A | 6/2000 | Yu |
| 6,103,078 A | 8/2000 | Hitchems |
| 6,110,342 A | 8/2000 | Mani |
| 6,110,385 A | 8/2000 | Copa |
| 6,117,297 A | 9/2000 | Goldstein |
| 6,126,796 A | 10/2000 | Shimamune |
| 6,126,805 A | 10/2000 | Batchelder |
| 6,139,714 A | 10/2000 | Livshits |
| 6,190,564 B1 | 2/2001 | Lehmann |
| 6,221,248 B1 | 4/2001 | Lin |
| 6,267,855 B1 | 7/2001 | Watanabe |
| 6,270,671 B1 | 8/2001 | Shorr |
| 6,273,937 B1 | 8/2001 | Schucker |
| 6,280,601 B1 | 8/2001 | Doring |
| 6,284,124 B1 | 9/2001 | DiMascio |
| 6,312,577 B1 | 11/2001 | Ganzi |
| 6,315,886 B1 | 11/2001 | Zappi |
| 6,315,906 B1 | 11/2001 | Sassaman, Jr. |
| 6,328,896 B1 | 12/2001 | Atnoor |
| 6,337,014 B1 | 1/2002 | Regunathan |
| 6,342,163 B1 | 1/2002 | DeLonge |
| 6,343,752 B1 | 2/2002 | Sleasman et al. |
| 6,355,157 B1 | 3/2002 | Martin |
| 6,358,421 B1 | 3/2002 | Newenhizen |
| 6,373,680 B1 | 4/2002 | Riskin |
| 6,375,851 B1 | 4/2002 | Sterling |
| 6,383,389 B1 | 5/2002 | Pilgram |
| 6,391,448 B1 | 5/2002 | Geiser |
| 6,398,965 B1 | 6/2002 | Arba |
| 6,409,926 B1 | 6/2002 | Martin |
| 6,410,672 B1 | 6/2002 | MacDonald |
| 6,419,817 B1 | 7/2002 | Kim |
| 6,419,823 B2 | 7/2002 | DeLonge |
| 6,423,234 B1 | 7/2002 | Martin |
| 6,440,310 B1 | 8/2002 | Shorr |
| 6,472,223 B1 | 10/2002 | Stannard |
| 6,482,305 B1 | 11/2002 | Mani |
| 6,485,641 B1 | 11/2002 | McLeod |
| 6,491,181 B1 | 12/2002 | Martin |
| 6,497,817 B1 | 12/2002 | Liang |
| 6,510,959 B1 | 1/2003 | Van Newenhizen |
| 6,514,398 B2 | 2/2003 | DiMascio |
| 6,568,282 B1 | 5/2003 | Ganzi |
| 6,572,758 B2 | 6/2003 | Zolotarsky |
| 6,582,605 B2 | 6/2003 | Krulik |
| 6,592,762 B2 | 7/2003 | O'Regan, Jr. |
| 6,607,647 B2 | 8/2003 | Wilkins |
| 6,613,230 B2 | 9/2003 | Krulik |
| 6,620,315 B2 | 9/2003 | Martin |
| 6,623,647 B2 | 9/2003 | Martin |
| 6,638,413 B1 | 10/2003 | Weinberg |
| 6,645,385 B2 | 11/2003 | Krulik |
| 6,645,400 B2 | 11/2003 | Martin |
| 6,649,037 B2 | 11/2003 | Gifford |
| 6,652,758 B2 | 11/2003 | Krulik |
| 6,693,139 B2 | 2/2004 | Bachman |
| 6,723,246 B2 | 4/2004 | Krulik |
| 6,726,893 B2 | 4/2004 | Lee |
| 6,733,636 B1 | 5/2004 | Heins |

(56) References Cited

U.S. PATENT DOCUMENTS

| | | |
|---|---|---|
| 6,763,846 B2 | 7/2004 | Haruch |
| 6,790,362 B2 | 9/2004 | FitzGerald |
| 6,796,436 B2 | 9/2004 | Carson |
| 6,797,134 B2 | 9/2004 | Weinberg |
| 6,824,662 B2 | 11/2004 | Liang |
| 6,830,683 B2 | 12/2004 | Gundrum |
| 6,830,689 B2 | 12/2004 | Hong |
| 6,887,452 B1 | 5/2005 | Pecoraro |
| 7,001,516 B1 | 2/2006 | Hong |
| 7,087,211 B2 | 8/2006 | Balachandran |
| 7,087,654 B2 | 8/2006 | MacDonald |
| 7,094,325 B2 | 8/2006 | Mack |
| 7,163,964 B2 | 1/2007 | Chidambaran |
| 7,338,590 B1 | 3/2008 | Shelnutt |
| 7,344,629 B2 | 3/2008 | Holmes |
| 7,780,833 B2 | 8/2010 | Hawkins |
| 7,959,780 B2 | 6/2011 | Hawkins |
| 8,293,085 B2 | 10/2012 | Hawkins |
| 8,562,803 B2 | 10/2013 | Nyberg |
| 9,090,493 B2 | 7/2015 | Nyberg |
| 2002/0172871 A1 | 11/2002 | Schucker |
| 2003/0019818 A1 | 1/2003 | Carson |
| 2003/0041908 A1 | 3/2003 | Scanlan |
| 2003/0116430 A1 | 6/2003 | Kurokawa |
| 2004/0005719 A2 | 1/2004 | Godec |
| 2004/0027100 A1 | 2/2004 | Xu |
| 2004/0108277 A1 | 6/2004 | Krulik |
| 2005/0109703 A1 | 5/2005 | Newenhizen |
| 2005/0279500 A1 | 12/2005 | Hawkins et al. |
| 2006/0032630 A1 | 2/2006 | Heins |
| 2006/0137986 A1 | 6/2006 | Holmes |
| 2006/0138997 A1 | 6/2006 | Holmes |
| 2006/0169586 A1 | 8/2006 | Zhang |
| 2007/0108056 A1* | 5/2007 | Nyberg .................. B01D 61/44 204/554 |
| 2007/0120523 A1 | 5/2007 | Holmes |
| 2007/0175766 A1 | 8/2007 | Holmes |

FOREIGN PATENT DOCUMENTS

| | | |
|---|---|---|
| DE | 10217885 A1 | 11/2003 |
| EP | 0537526 A1 | 4/1993 |
| EP | 0638664 A1 | 2/1995 |
| EP | 0642824 | 3/1995 |
| EP | 1075868 | 2/2001 |
| EP | 1172145 A | 1/2002 |
| GB | 1289738 A | 9/1972 |
| JP | 06-079278 | 3/1994 |
| JP | 07-136653 | 5/1995 |
| JP | 09-138207 | 5/1997 |
| JP | 10-085746 | 4/1998 |
| JP | 10-216723 | 8/1998 |
| JP | 2000-202449 | 7/2000 |
| JP | 2001-259634 | 9/2001 |
| WO | WO93/20929 A1 | 10/1993 |
| WO | WO98/32525 | 7/1998 |
| WO | WO99/28240 | 6/1999 |
| WO | WO02/14224 A1 | 2/2002 |
| WO | WO02/079098 | 10/2002 |
| WO | WO03/020404 A2 | 3/2003 |
| WO | WO2005/009596 | 2/2005 |
| WO | WO2005009596 | 2/2005 |
| WO | WO2005/049205 A2 | 6/2005 |
| WO | WO2007/044609 | 4/2007 |

OTHER PUBLICATIONS

J-A Almale Murilo, PCT/US2005/026617 International Search Report and Written Opinion, Oct. 20, 2005.

Masashi Honda, PCT/US2005/045254_International Search Report and Written Opinion, Jul. 25, 2007.

Amadine Huniak, PCT/US2005/045024_International Search Report and Written Opinion, Jun. 23, 2006.

Philippe Becamel, PCT/US2006/039297_International Report on Patentability, Apr. 9, 2008.

* cited by examiner

ANTI-SCALE ELECTROCHEMICAL APPARATUS WITH WATER-SPLITTING ION EXCHANGE MEMBRANE

CROSS-REFERENCE

The present application claims priority from U.S. Provisional Application No. 62/099,447, filed on Jan. 3, 2015, entitled "ANTI-SCALE ELECTROCHEMICAL APPARATUS WITH WATER-SPLITTING ION EXCHANGE MEMBRANE", and which is incorporated by reference herein in its entirety.

BACKGROUND

Embodiments of the present invention relate to the treatment of water in an electrochemical apparatus comprising a water-splitting ion exchange membrane.

A water-treatment electrochemical apparatus comprises an ion exchange cell to treat water by selectively exchanging ions present in the water to remove contaminants, reduce total dissolved solids (TDS), treat industrial or hazardous waste water, desalinate salt water, and for other applications. The ion exchange cell comprises a water-splitting ion exchange membrane positioned between electrodes in a water-tight housing. When a current is applied to the electrodes by a cell power supply, water is irreversibly dissociated into $H^+$ and $OH^-$ ions at the boundary between the cation and anion exchange layers of the membrane(s), causing cations and anions to be exchanged from the water stream passing through the cell. Advantageously, when the reverse electric potential is applied while flushing the cell with water, the membranes of the water-splitting ion exchange cell are regenerated without the use of hazardous chemicals or salt. For continuous operation, two or more ion exchange cells can be connected to allow treatment of water in one cell while another cell is being regenerated. The cell can also have a valve system to control the flow of water during treatment and regeneration processes. Such electrochemical ion exchange apparatus are described in commonly assigned U.S. Pat. Nos. 5,788,812; 7,344,629; 7,780,833; 7,959,780; 8,293,085; and 8,562,803; all of which are incorporated herein by reference in their entireties.

However, it was found that treatment of hard water in such electrochemical cells can cause failure of the apparatus after multiple treatment and regeneration cycles due to scale deposits. Hard water contains dissolved multivalent ions, such as for example calcium, magnesium or manganese ions, and bicarbonate or sulfate ions. During hard water treatment, these ions form compounds that precipitate out of the water being treated or when the cell is being regenerated, to form scale deposits on cell walls, water lines, valves and other components. For example, dissolved calcium and magnesium ions in the presence of bicarbonate ions can precipitate out in the form of calcium or magnesium carbonate compounds. The accumulation of scale on the walls and water lines can require frequent cleaning of these components. Scale accumulation can also increase the required water pressure by constricting water line openings and channels within the cell. Additionally, scale binding to the ion exchange membrane reduces its effective ion exchange surface area and the flow rate of water through the membrane causing poorer or slower deionization. Scale formation also results in valve and drain leaks, valve and drain clogging, and cell overheating.

For these and other reasons, further developments and improvements in scale reduction within electrochemical apparatus and their ion exchange cells are continuously being sought.

SUMMARY

An anti-scale ion exchange cell comprises a housing having a plurality of openings to receive and release a water stream, inner and outer electrodes in the housing, a water-splitting membrane between the inner and outer electrodes to treat an influent water stream to form an effluent water stream, and a controlled-release scale-inhibitor composite in the housing, the controlled-release scale-inhibitor composite comprising a scale-inhibitor agent and a polymer.

An anti-scale electrochemical apparatus comprises a plurality of anti-scale ion exchange cells as described above, the ion exchange cells connected to one another to allow regeneration of one ion exchange cell while another ion exchange cell being is used to treat water. A power supply is provided to apply a current to the inner and outer electrodes of each ion exchange cell. A valve system is provided to control the flow of water between the ion exchange cells for water treatment or regeneration.

A method of fabricating an anti-scale electrochemical apparatus comprising an ion exchange cell. The method comprises forming a controlled-release scale-inhibitor composite comprising a scale-inhibitor agent and a polymer such that a concentration ratio of the scale-inhibitor agent to the polymer is sufficiently high to provide an average concentration of at least about 0.5 ppm of the scale-inhibitor agent in a regenerant water stream generated during cell regeneration over treatment of an entire volume of water that can be processed by the water-splitting membrane before the membrane needs to be replaced. An ion exchange cell comprises a housing enclosing an ion exchange membrane between inner and outer electrodes, the cell having a water flow pathway. The controlled-release scale-inhibitor composite is provided in the water flow pathway of the ion exchange cell.

An anti-scale water-splitting membrane comprises a water-splitting interface formed by contact of (i) an anion exchange layer, and (ii) a cation exchange layer, wherein either the anion exchange layer or the cation exchange layer comprises a scale-inhibitor agent in a concentration sufficiently high to provide at least an average concentration of at least about 0.5 ppm of scale-inhibitor agent in a regenerant water stream that is generated during cell regeneration over treatment of an entire volume of water that can be processed by the water-splitting membrane before the membrane needs to be replaced.

An ion exchange cell comprises a housing having a plurality of openings to receive and release a water stream, inner and outer electrodes in the housing, and the anti-scale water-splitting membrane as defined above.

An anti-scale electrochemical apparatus comprising a plurality of ion exchange cells, each ion exchange cell comprising a housing having a plurality of openings to receive and release a water stream, inner and outer electrodes in the housing, and a water-splitting membrane between the inner and outer electrodes to treat an influent water stream to form an effluent water stream. A power supply is provided to apply a current to the inner and outer electrodes of each cell. A valve system is provided to control the flow of water between the cells for water treatment or regeneration. A canister is provided in a water flow pathway of the ion exchange cells or valve system, the canister comprising a controlled-release scale-inhibitor composite, the controlled-release scale-inhibitor composite comprising a scale-inhibitor agent and a polymer.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

Figure 12:
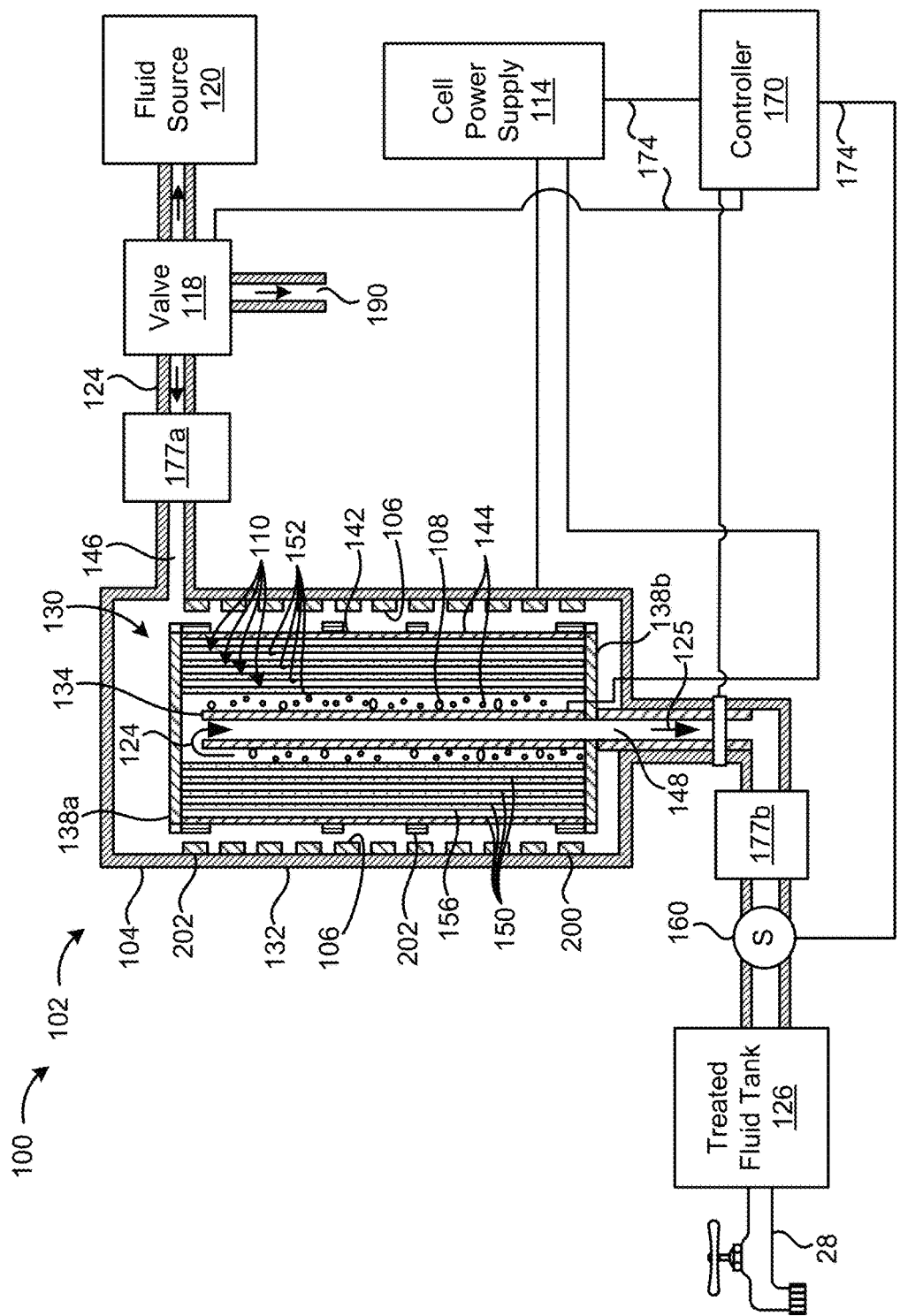
Figure 13:
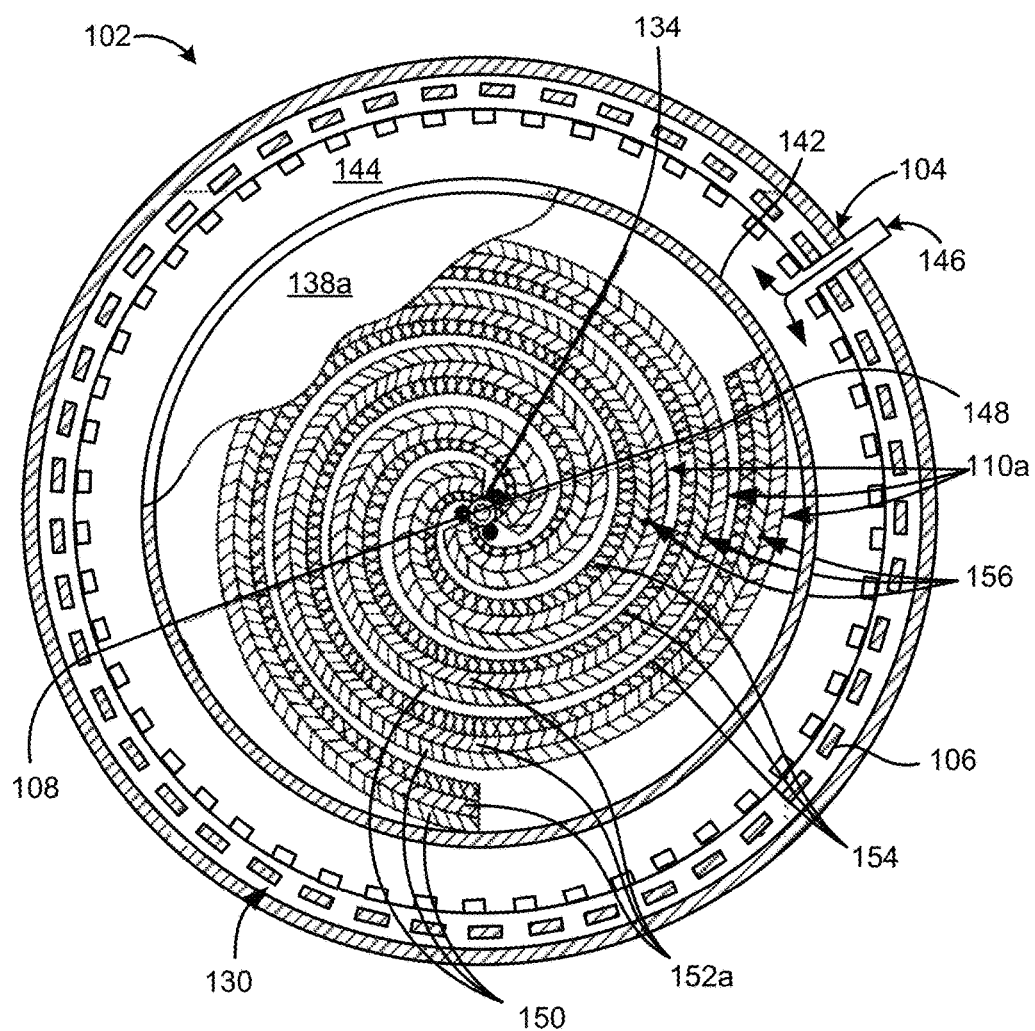

FIG. 12 is a schematic, partial-sectional, side view of an anti-scale electrochemical apparatus for treating water comprising an ion exchange cell with CRSIC bands about a plurality of water-splitting membranes and electrodes; and FIG. 13 is a schematic, partial-sectional top view of an anti-scale ion exchange cell comprising a cartridge with a plurality of anti-scale, water-splitting, ion exchange membranes that each containing a scale-inhibitor agent, the membranes being spirally wound around a core tube.

DESCRIPTION

Figure 1:
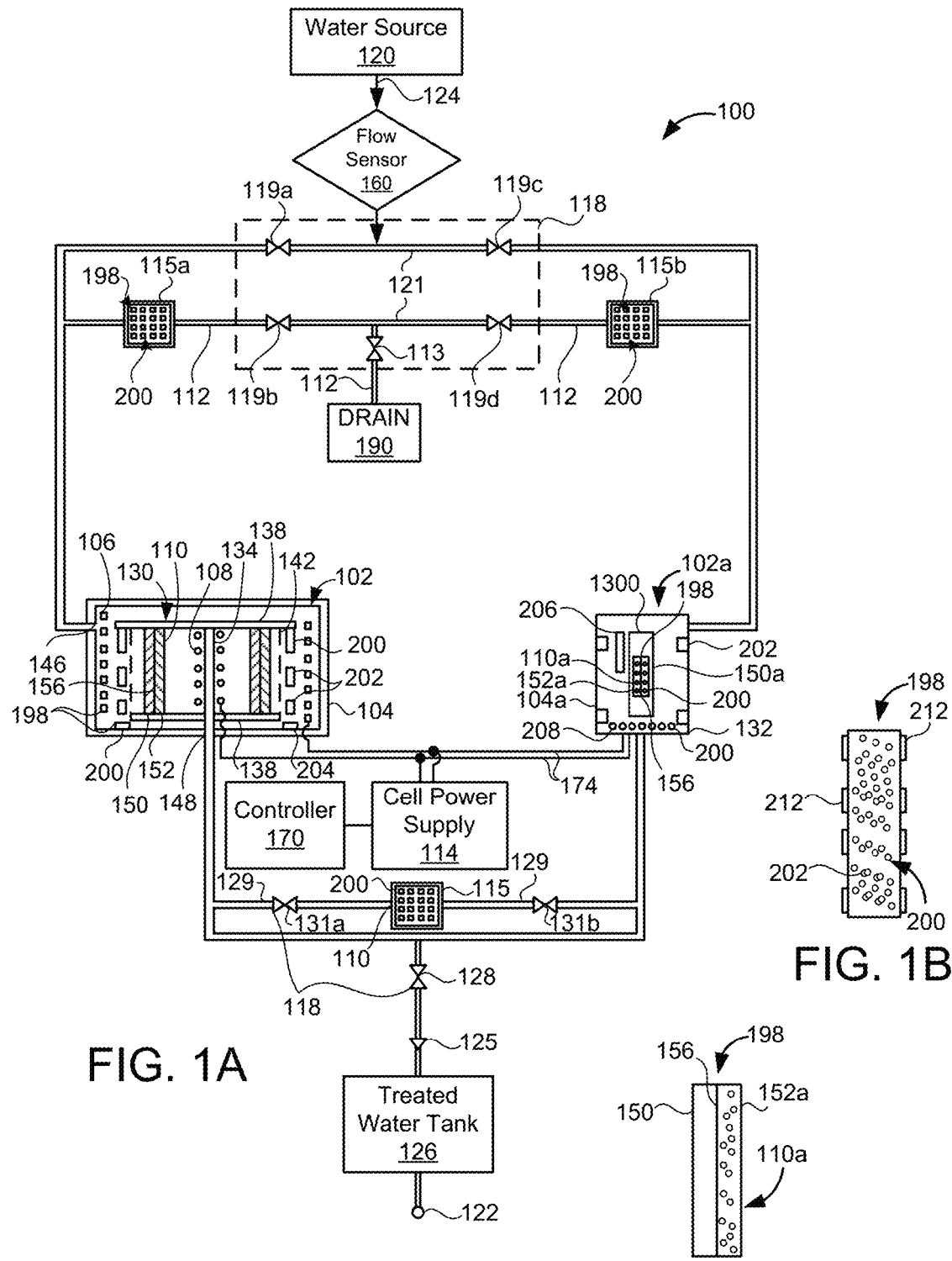
FIG. 1A is a schematic view of an embodiment of an anti-scale electrochemical apparatus for treating water comprising a pair of ion exchange cells, and showing controlled-release scale-inhibitor articles positioned at different locations in a water flow pathway within the apparatus.
FIG. 1B is a schematic sectional view of a controlled-release scale-inhibitor composite (CRSIC) shaped as a band composed of particles of scale-inhibitor agent embedded in a matrix.
FIG. 1C is a schematic sectional view of a controlled-release scale-inhibitor article comprising an anti-scale, water-splitting, ion exchange membrane comprising (i) an anion exchange layer having particles of scale-inhibitor agent embedded therein, and (ii) a cation exchange layer.

An embodiment of an anti-scale electrochemical apparatus 100 capable of reducing scale precipitation while treating water to extract or replace ions from water is illustrated in FIG. 1A. The apparatus 100 changes the type or concentration of soluble ions in a water stream passed therethrough and reduces levels of microorganisms in the water. While exemplary embodiments of an electrochemical apparatus 100 are described to illustrate the present invention, these illustrative embodiments should not be used to limit the scope of the invention. For example, the electrochemical apparatus 100 can include water treatment cells other than ion exchange cells described herein, such as sediment filters, carbon filters, disinfection cells, and the like, as would be apparent to those of ordinary skill in the art. Thus the illustrative embodiments described herein should not be used to limit the scope of the present invention.

Referring to FIG. 1A, the anti-scale electrochemical apparatus 100 comprises one or more ion exchange cells 102, 102a connected to one another to allow regeneration of one cell 102 while simultaneously another cell 102a is used to treat water in serial operation, and/or to allow both cells 102, 102a to be used to treat water working in parallel operation during a water treatment cycle. As shown, an exemplary ion exchange cell 102 comprises a housing 104 which is water-tight and encloses at least two electrodes, such as an outer electrode 106 and an inner electrode 108 positioned on either side of one or more water-splitting, water-splitting membranes 110, and a plurality of openings including a first opening 146 and a second opening 148. In one version, the water-splitting membranes 110 are wrapped around a core tube 134, covered with netting 142 and attached to an end cap 138, to form a cartridge 130. A power supply 114 is provided to power the outer and inner electrodes 106, 108, respectively, by supplying a current or voltage to the electrodes via the electrical lines 174. During a water treatment, deionization cycle, the first opening 146 which is located adjacent to the outer electrode 106, serves as an inlet for an influent water stream while the second opening 148 serves as an outlet for the treated effluent water stream. During a regeneration cycle, the second opening 148 serves as an inlet for an influent water stream to regenerate the cell 102, and the first opening 146 serves as an outlet for the regeneration waste water effluent stream generated in the regeneration process. A valve system 118 comprising a plurality of valves, for example, a drain valve 113, one or more solenoid valves 119*a-d*, and an outlet valve 128, controls an influent water stream 124 from a water source 120 which is passed via water lines 121 (i) into the cells 102, 102*a* for treatment of the water, (ii) to regenerate the cells 102, 102*a* and pass regeneration waste water to a drain 190 via a drain line 112 and drain valve 113, or (iii) pass a treated effluent water stream 125 out of the cells 102, 102*a* through the outlet valve 128 to a treated water tank 126 and/or a treated water outlet 122. A flow sensor 160, such as a turbine, is positioned along the influent water stream 124 and oriented to rotate or otherwise move with the fluid stream to detect the flow rate of water through the cells 102, 102*a*.

In conventional electrochemical apparatus, it was discovered that scale accumulation in the membranes, valve system, drain or outlet valve, and water lines, eventually resulted in leaking or clogging of the membranes, water lines, and valves. For example, in operation, higher scale deposits were often found in the surfaces of the solenoid valves, the body and plunger of the drain valve, and in adjacent water lines such as the drain line. Scale problems became especially a problem when the hardness level in the water being treated was at, or exceeding, 5 grains/gal. Scale formation by the precipitation of solid calcium and magnesium carbonate is an endothermic reaction that is accelerated by high temperatures. It was determined that the excessive scale formation resulted from the higher temperatures of up to 40° C. which occurred during regeneration of the cells, as well as the higher concentration of ions in these regions of the apparatus. The buildup of scale on the valves can cause the drain line to plug-up or leak. A valve system having alternative valves, such as for example, a single or multiple rotary valves (not shown) also started leaking after treatment of around 1500 L of water due to scale buildup preventing adequate sealing. As another example, precipitated scale in a solenoid valve was found to cause the valve to leak or remain open after treatment of around 750 L of effluent water, which is equivalent to the treatment of about 2300 L of influent water. Drain leaks and drain clogs also caused the electrochemical apparatus to malfunction due to poor regeneration and cell overheating. Still further, scale build-up on the anion side of the ion exchange membrane was also found to reduce the effective membrane surface area causing slower deionization, constricting water flow channels within the membrane, and restricting the flow of water through the membranes.

To solve the scale accumulation problem, the dissolution rates of different scale-inhibitor agents were tested to identify suitable anti-scale compounds for an anti-scale electrochemical apparatus 100. The dissolution rate needed to be sufficiently high to provide a sufficiently high concentration level of scale-inhibitor agent during operation of the apparatus 100 that would reduce or even prevent formation of scale in the apparatus 100. An excessively high dissolution rate was found to require frequent replacement or addition of scale-inhibitor agent which is undesirable; while too low a dissolution rate resulted in scale formation in the apparatus. The scale-inhibitor agents tested for dissolution rate included:

(1) Micromet™ 6R, a sodium polyphosphate scale inhibitor whose dissolution rate is controlled with magnesium oxide, available from Nu Calgon, St. Louis, Mo.;

(2) Pentek™ PCC-1 Polyphosphate Filter Cartridge provided as canister, manufactured by Pentek, available from Watts Company, http://watts.com;

(3) Siliphos™ II, a sodium polyphosphate of unknown chain size bound to silica to control dissolution rates, available in the form of spheres or powder of which the spheres were used, manufactured by BK Guilini, Germany, and available from Phoenix Products Company, Terryville, Conn.;

(4) Vitraphos™ long-chain (n=21) powdered sodium polyphosphate, manufactured by Innophos powder, available from Univar USA Inc., San Jose, Calif.; and (5) Hexafos™, medium chain (n=12) sodium polyphosphate in plate form, available from ICL Performance Products, St. Louis, Mo.

Figure 2:
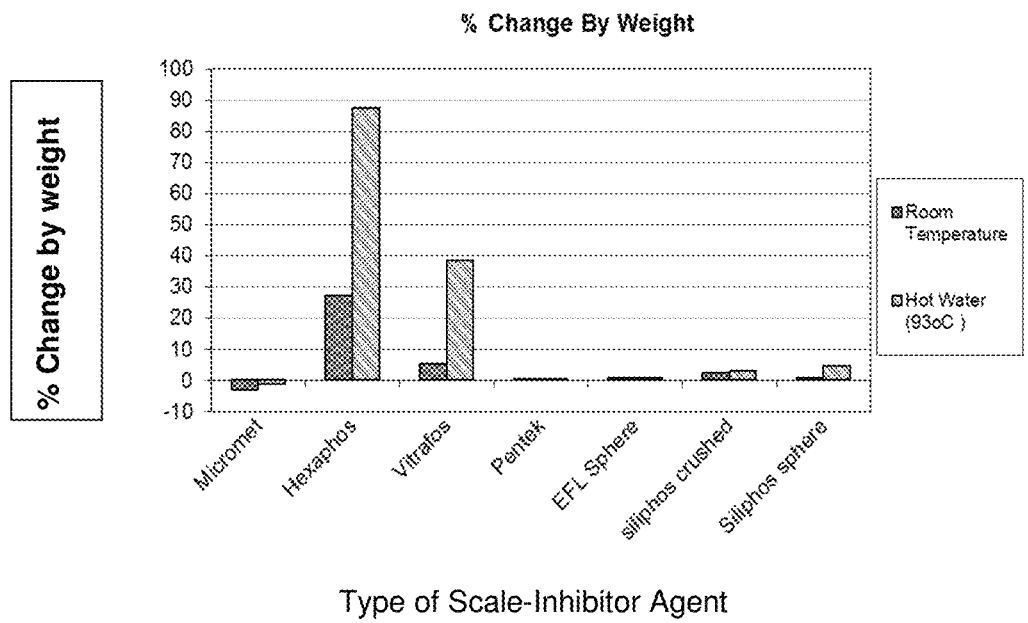
FIG. 2 is a bar chart showing the dissolution rate of the different scale-inhibitor agents measured as a percent change in weight after soaking for 5 minutes in (i) tap water maintained at room temperature, and (ii) hot water at a temperature of 93° C.

The dissolution rate of samples of the scale-inhibitor agent, which is a measure of the concentration level of scale-inhibitor agent provided to the flowing water stream, were measured as a percent change in weight of the sample after soaking the sample for 5 minutes, in tap water maintained at room temperature, and in hot water at a temperature of 93° C. The dissolution rates, as shown in FIG. 2, demonstrate that certain scale-inhibitor agents dissolved at widely varying dissolution rates which were either too fast or too slow. For example, the Vitrafos™ and Hexaphos™ sample, both of which were in the form of plates of pure sodium polyphosphate compounds, dissolved too quickly. In contrast, Pentek™ sample obtained as granules filling a canister had an excessively low dissolution rate. The Micromet™ 6R sample, a sodium polyphosphate scale inhibitor mixed with magnesium oxide, also had too slow a dissolution rate. These experiments confirmed that conventional scale-inhibitor agents did not provide a dissolution rate suitable for the electrochemical apparatus.

Two versions of a controlled-release scale-inhibitor article 198 were fabricated to reduce the scaling problem in the electrochemical apparatus 100. In one version, the controlled-release scale-inhibitor article 198 was a controlled-release scale-inhibitor composite (CRSIC) 200 comprising a scale-inhibitor material embedded in a matrix material as shown in FIG. 1B. Shaped articles or forms of the CRSIC 200 were then positioned in a water flow pathway of the anti-scale electrochemical apparatus 100 to reduce scaling problems over multiple treatment and regeneration cycles, as shown in FIG. 1A. The water flow pathway can be within an ion exchange cell 102, between a cell 102 and the valve system 118, along any of the water lines 121 or bleed line 129, and even in the drain line 112 of the apparatus 100. In another version, the controlled-release scale-inhibitor article 198 was an anti-scaling, water-splitting membrane 110*a* which included an anion or cation exchange formulation, binding matrix material, and scale-inhibitor agent, as shown in FIG. 1C, and which was used to replace the conventional water-splitting membrane 110 in the ion exchange cell 102*a*, as shown in FIG. 1A. The two versions can be used by themselves or in combination.

The following examples illustrate different exemplary configurations of an anti-scale electrochemical apparatus 100 which contains a controlled-release scale-inhibitor article 198 in the form of a CRSIC 200 or a anti-scaling, water-splitting water-splitting membrane 110*a*; ion exchange cells 102, 102*a*; and/or canisters 115, 115*a,b*. While particular embodiments are provided to illustrate the invention, the scope of the present claims should not be limited to the examples provided herein.

In a first version, the controlled-release scale-inhibitor article 198 comprising CRSIC 200 and/or anti-scaling, water-splitting membrane 110*a* were fabricated by embedding a selected scale-inhibitor agent into a selected matrix such that the resultant article provided a predetermined release rate and hence average concentration level of scale-inhibitor agent in the water stream passing through the apparatus 100 that is tailored for a particular water treatment application. It is believed that the scale-inhibitor agent operates as a surface-active material that interferes with scale precipitation through three distinct mechanisms. For example, threshold inhibition can occur when a sub-stochiometric (catalytic) amount of a scale-inhibitor agent is used to prevent the precipitation of scale compounds even as they become supersaturated. Threshold inhibition occurs when negatively charged groups prevent crystal growth through electrostatic interactions. In another mechanism, crystal distortion occurs when the scale-inhibitor agent modifies the surface of a crystal, preventing the propagation of crystal growth. Crystal growth requires the surface of the crystal to perfectly match, creating a larger crystal of consistent density. Irregular crystal structures do not allow for this. In yet another mechanism, dispersion occurs when a scale-inhibitor agent with an anionic charge adsorbs onto the crystal surface. The crystals stop growing due to the electrostatic and steric interactions between the crystal surfaces.

A suitable scale-inhibitor agent was experimentally determined to be sodium polyphosphate and formulations containing sodium polyphosphate, such as for example, mixtures of sodium polyphosphates of different chain lengths and stochiometric formulae. For example, medium chain length (n=12) and long-chain length (n=21) sodium polyphosphates in powdered or granulated form were found to be suitable. An exemplary sodium polyphosphate having a medium chain length in plate form includes Hexafos™ available from ICL Performance Products, St. Louis, Mo. A suitable long-chain length sodium polyphosphate in powder form included Vitrafos™, manufactured by Innophos powder, available from Univar USA Inc., San Jose, Calif. Still other suitable sodium polyphosphates included Micromet™ 6R, a sodium polyphosphate scale inhibitor whose dissolution rate is controlled with magnesium oxide, available from Nu Calgon, St. Louis, Mo.; Pentek™ PCC-1 Polyphosphate Filter Cartridge provided as canister, manufactured by Pentek, available from Watts Company, http://watts.com, and Siliphos™ II, a sodium polyphosphate of unknown chain size bound to silica to control dissolution rates, available in the form of spheres or powder, manufactured by BK Guilini, Germany, and available from Phoenix Products Company, Terryville, Conn.

A preferred scale-inhibitor agent was found to be sodium hexametaphosphate, for example, having an average stochiometric formula $(NaPO_3)_6$. It is believed that sodium hexametaphosphate operates as a sequestering molecule by binding to the dissolved calcium or magnesium ions in the water to prevent the ions from combining with ionic carbonate species. Sodium hexametaphosphate exhibits threshold inhibition because it performs well far below the calculated stoichiometric requirements even when the amount of hardness ions in the water stream is relatively high. For example, it was found that the calcium ions in water having a hardness of 200 ppm and present in the form of calcium carbonate (12 Grains/gallon) is sequestered by from about 2 to about 4 ppm of sodium hexametaphosphate even though the stoichiometric reaction calculation required about 500 ppm of sodium hexametaphosphate. Suitable commercially available sodium hexametaphosphate include Vitrafos™ LC manufactured by Innophos powder and available from Univar USA Inc., San Jose, Calif. In one method of fabrication, the scale-inhibitor agent is used in the form of particles having an average size from about 50 to about 500 microns, or even from about 100 to about 250 microns.

The controlled-release scale-inhibitor article 198, such as the CRSIC 200 or anti-scaling, water-splitting membrane 110a, was formed by mixing a scale-inhibitor agent with a matrix material. The matrix material also serves as a binder to allow fabrication of a shaped form suitable for placement along the water flow path of the electrochemical apparatus. Conventional matrix materials which are used to slow dissolution rates, include inorganic oxides such as silica or magnesium oxide, such as for example, Siliphos™ II, which blends sodium polyphosphate with silica. However, when such matrix materials dissolve into the water, they can be undesirable when they contaminate the water with chemical species other than the scale inhibitor. Also, when inorganic oxides are used to slow dissolution rates, the resultant composite is rigid which can be difficult to use in practice.

It was determined that suitable matrix materials would (i) slow down the dissolution of an anti-scaling agent without dissolving in the water, (ii) be stable in the electrochemical cell environment, and (iii) be sufficiently flexible to conform to different positions or attachment locations in a cell 102, canister 115 or other housing structures. A suitable matrix was found to be a polymer, such as for example, at least one of a non-hydrolyzable crosslinked and uncrosslinked polymer, radiation crosslinked polymer, thermoset polymer and thermoplastic polymer. In one version, the selected polymer was polyolefin, a thermoplastic polymer that is particular stable in aqueous solutions. Advantageously, the thermoplastic polymer enables forming a controlled-release scale-inhibitor article 198 into a desired shape for a cell 102 or canister 115, by extrusion or molding. A suitable polyolefin can include, for example, polyethylene, polypropylene, polyvinyldifluoride, polyethylene copolymers, polypropylene copolymers, or poly(styrene-butadiene) elastomers. For controlled release scale-inhibitor articles that need to more flexible for a particular cell geometry or attachment position, lower density polyolefins or elastomers are preferred, for example when the controlled-release scale-inhibitor article 198 is to be in the water flow pathway of the electrochemical apparatus 100 in such a way as to require bending, snapping, or other compliance during installation. Suitable flexible polymers include, for example poly(styrene-butadiene) elastomers and low density polyolefins.

The selected matrix binds together, and can even partially enclose, the scale-inhibitor agent such that the resultant controlled-release scale-inhibitor article 198 slowly releases anti-scale compound to provide a predetermined average concentration of scale-inhibitor into the water passing through an ion exchange cell 102, 102a, or passing through the water passageway of the water lines 121 of the electrochemical apparatus 100. The concentration of scale-inhibitor agent in the controlled-release scale-inhibitor article 198 should be sufficiently high to provide substantial particle-particle contacts so that the scale-inhibitor agent in the body of the article 198 can be reached and dissolved by the water flowing through the apparatus 100. The degree of percolation of water into the partially dissolvable, controlled-release scale-inhibitor article 198 can be estimated by the fraction of dissolvable or soluble filler that is inserted into a matrix material.

In one version, the controlled-release scale-inhibitor article 198 comprises a concentration ratio of scale-inhibitor agent to matrix material, such as polymer, that is sufficient, or sufficiently high, to provide scale inhibition over treatment of the entire volume of water that can be processed by the water-splitting membrane 110 or the anti-scale, water-splitting membrane 110a, before either of the water-splitting membranes 110, 110a needs to be replaced. The entire volume of water that can be processed by the water-splitting membranes 110, 110a is the volume of water processed—before the membranes 110, 110a exhibit water channeling such that the maximum and minimum flow rates across the membrane surface excessively differ from one another. Even in the absence of scale accumulation on the membrane surfaces, water channeling can result from the expansion-contraction of the membranes 110, 110a as they cycle between deionization and regeneration states. The membranes 110a, 110a are replaced when this channeling causes a reduction in deionization performance of at least 10% (eg. TDS reduction decreases from 95% to 85%) or a flow rate decrease of at least 30% (eg. from 1.0 to 0.7 liters/minute). In one version, the entire volume of water that can be processed by one or more membranes 110, 110a before the membrane(s) need to be replaced is typically at least 2500 L of water, or even at least about 5000 L of water, or even at least about 10,000 L of water, depending on the feed water composition. Thus the concentration ratio of scale-inhibitor agent to matrix material in the controlled-release scale-inhibitor article 198 can be selected such that the scale-inhibitor agent is substantially entirely dissolved (more than 95% dissolved) while treating at least about 2500 L of water, or even at least about 5000 L of water, or even at least about 10,000 L of water, in the electrochemical apparatus 100.

In one version, the controlled-release scale-inhibitor article 198 comprises a concentration ratio of scale-inhibitor agent to matrix material, such as polymer, which is selected to provide at least an average concentration of at least about 0.5 ppm of the scale-inhibitor agent in a regenerant water stream that is generated during cell regeneration over treatment of the entire volume of water that can be processed by the membranes 110, 110a before the membranes need to be replaced. The concentration ratio of scale-inhibitor agent to matrix material, such as polymer, can also be selected to provide at least an average concentration of from about 1 to about 12 mg/L of scale-inhibitor agent in a regenerant water stream that is generated during cell regeneration over treatment of the entire volume of water that can be processed by the membranes 110, 110a before the membrane needs to be replaced. In another version, the controlled-release scale-inhibitor article 198 comprises a concentration ratio of scale-inhibitor agent to matrix material, such as polymer, that is sufficiently high to dissolve at least about 25% by volume of the scale-inhibitor present in the controlled-release scale-inhibitor article 198 over treatment of the entire volume of water that can be processed by the membranes 110, 110a before the membranes need to be replaced.

A suitable concentration ratio (volume ratio) of scale-inhibitor agent to matrix material, such as polymer, that achieves the desired results over the usable lifetime of the membranes 110, 110a was determined to be at least about 1:5, or even at least about 1:1, or even at least about 3:2. A suitable concentration ratio of scale-inhibitor agent to matrix material, such as polymer, was determined to be from about 20% by volume to about 60% by volume, or even from about 30% by volume to about 50% by volume, or even from about 35% by volume to about 45% by volume. Higher concentration levels of the scale-inhibitor agent provided a greater concentration of scale-inhibitor agent released into the water but also depleted more quickly the scale-inhibitor agent in the controlled-release scale-inhibitor article 198. Lower scale-inhibitor agent concentration levels provide fewer channels for the scale-inhibitor agent to diffuse out of the shaped form of the controlled-release scale-inhibitor article 198. As an example, the controlled-release scale-inhibitor article 198 can comprise scale-inhibitor agent in the amount of from about 20% by volume to about 60% by volume, and to matrix material, such as polymer, in the amount from about 80% by volume to about 40% by volume.

In an exemplary fabrication process, a controlled-release scale-inhibitor article 198, such as the CRSIC 200, is fabricated by mixing particles of scale-inhibitor agent with a matrix material which is in the form of particles or liquid to form the structure shown in FIG. 1B. A mixer such as a Brabender Mixing Bowl, Twin Screw Extruder, or other polymer fabrication equipment, can be used. The resultant mixture is pressure formed, for example in a ram press, isostatic press, or an injection molding machine, to a suitable shape. A controlled-release scale-inhibitor article 198, such as a CRSIC 200, is shaped to fit into the housing of an ion exchange cell 102, 102a to allow the passage of water across the cell from the first opening 146 to the second opening 148 of the housing of the cell 102, or vice versa. The CRSIC 200 can also be shaped to be positioned in canisters 115, 115a,b, which are placed in the water flow pathway of the electrochemical apparatus 100, such as between the cells 102, 102a and valve system 118, or in the water lines 121, while still allowing water to pass through the canisters 115, 115a,b.

In one version, a controlled-release scale-inhibitor article 198 comprising a CRSIC 200 was fabricated to include a scale-inhibitor comprising particles of sodium hexametaphosphate mixed with a matrix material comprising particles of polyolefin. The mixture was pressed in a hydraulic hot press to form a suitable shape. The sodium hexametaphosphate can be Vitrafos™ LC manufactured by Innophos powder and available from Univar USA Inc., San Jose, Calif. To provide a flexible composite, the matrix material may be, for example, Exact 3039, Sclair 2114, Engage™ 8003, or Sclair 2316. A suitable concentration ratio of sodium hexametaphosphate to polyolefin is at least 1:5, or even at least about 1:1, or even at least about 3:2. For example, the CRSIC 200 can comprise sodium hexametaphosphate in the amount of from about 20% by volume to about 60% by volume, and polyolefin in the amount from about 80% by volume to about 40% by volume.

It was further discovered that adding a surface barrier coating 212 to the shaped articles of a controlled-release scale-inhibitor article 198, such as the CRSIC 200 as shown in FIG. 1B, or to the anti-scale water-splitting membrane 110a of FIG. 1C (not shown), would allow achieving the desired and effective amount of scale-inhibitor agent in the coated article while extending the dissolution time of the scale-inhibitor agent of the composite material. The surface barrier coating 212 changes the effective dissolvable surface area of the controlled-release scale-inhibitor article 198. Acceptable surface barrier materials include polymers which can be applied as a coating to the surface(s) of the controlled-release scale-inhibitor article 198 to cover at least a portion of its exposed surface to reduce its exposure, and hence the dissolution rate, of the scale-inhibitor agent present in the bulk of the controlled-release scale-inhibitor article 198. Suitable barrier coating materials include thermoplastic polymers, thermoset polymers, epoxy, and still other polymeric materials. One suitable barrier coating material was found to be polyolefin. The surface barrier coating 212 can be applied by, for example, thermal lamination of a layer of solid polymer, co-extrusion of a thermoplastic polymer over the shaped controlled-release scale-inhibitor article 198, or even by spray or brush coating a liquid polymer onto the articles. The acceptable range of exposed surface area of the CRSIC 200 or anti-scale, water-splitting membrane 110a is at least about 10% of the total (exposed) surface area of the article, or even from about 5% to about 90% of the total surface area of the article.

The dissolution rate of the controlled-release scale-inhibitor article 198 such as the CRSIC 200 or the anti-scale, water-splitting membrane 110a can be expressed as a ratio of the exposed surface area to the volume of the composite article. The volume of the controlled-release scale-inhibitor article 198 is more appropriate than the mass of the article, as it is the available volume in an ion exchange cell 102, 102a, which defines the volume of a controlled-release scale-inhibitor article 198 that can be positioned in the cell or in a canister 115. Exposed surface area means the area not covered by a surface barrier. A suitable range for the ratio of the exposed surface area to the volume of the controlled-release scale-inhibitor article 198 can be from about 0.45 to about 9.51, such as for example, for CRSIC 200 shaped as bands or donuts. This ratio accounts for from 94% to 0% of the surface area having a surface barrier coating thereon.

A comparison study was conducted to determine the volume of input water processed before failure for a conventional, baseline electrochemical apparatus without scale-inhibitor agent and an anti-scale electrochemical apparatus 100 with controlled-release scale-inhibitor article 198 comprising CRSIC 200 in the water flow pathway of the apparatus 100. The baseline apparatus had a single ion exchange cell operated without any scale-inhibitor agent. The baseline failure rate established in the baseline apparatus, allowed treatment of approximately an average volume of treated water of about 2400 L before failure of the apparatus through clogging of the drain valve(s).

Two versions of an anti-scale electrochemical apparatus 100 comprising canisters 115a-c in a selected water flow pathway of a cell 102, 102a or the valve system 118 were constructed to test different scale-inhibitor agents. The water flow pathway location for the CRSIC 200 is selected so that scale-inhibitor agent released into the water flowing stream is prevented from passing directly to the outlet valve 128 and thus to the end user. Four locations which meet this condition are (1) in a bleed line located along the treated water pathway or water lines 121 of an apparatus 100 so that dissolved scale inhibitor flows into an ion exchange cell 102 during regeneration (during which time it passes through the cell to the drain 111; (2) scale-inhibitor agent is released during a regeneration cycle from an anti-scale water splitting membrane 110a wherein it was originally incorporated to pass to the drain 111; (3) within an ion exchange cell 102 and adjacent to the outer electrode 106 such that during a deionization cycle, the scale-inhibitor agent is absorbed by an water-splitting membrane 110, and during a regeneration cycle, the scale-inhibitor agent is released from the water-splitting membrane 110 and further dissolves out of the CRSIC 200 and passes to the drain 111; and (4) between the ion exchange cell 102 and the drain valve 113 where maximum scale accumulation occurs.

In the first anti-scale electrochemical apparatus 100, two canisters 115a,b that each contained a selected scale-inhibitor agent or CRSIC 200, were positioned in the water flow pathway leading to the drain line 112 so that a regenerant waste water stream from the cells 102, 102a, which is produced when the cells are being regenerated, passes through the canisters 115a,b also as illustrated in FIG. 1A. In this apparatus, regenerant waste water that comes out of an ion exchange cell 102, 102a during a regeneration cycle passes through one of the two anti-scale canisters 115a,b to dose the water with scale-inhibitor agent before the water passes through the drain valve 113 and to the drain 190. By releasing scale-inhibitor agent into the regenerant waste water stream before it passes through the drain line 112 and drain valve 113, scale accumulation is limited in these components. It was found that a drain line system comprising a pair of canisters that each contained sodium polyphosphate, increased the volume of treated water before failure to at least 10,000 L. This was at least 4 times the volume passed through a conventional electrochemical apparatus (about 2400 L of water) before failure by clogging or leakage.

In the second anti-scale electrochemical apparatus 100, a single canister 115 of pure scale-inhibitor or CRSIC 200 was positioned in a bleed line 129 located in the pathway of input water used to regenerate the cells 102, 102a (which is treated water from the treated water tank 126). Two check valves 131a,b (which are also part of the valve system 118) in the product flow stream parallel to the bleed line prevent water flow through this route during regeneration. This version releases scale-inhibitor agent into the water stream used to regenerate the cells 102, 102a, before the regenerant water stream enters the cells 102, 102a. In this version, the regenerant waste water stream emitted by the cells 102, 102a, already contains the scale-inhibitor agent, so that again, scale accumulation in the drain line 112 and drain valve 113 is reduced or prevented. This configuration also increases the life of the ion exchange membrane by preventing the buildup of scale on the anion surface of the membrane. It was found that a bleed line system comprising a single canister that contained sodium polyphosphate particles increased the volume of treated water before failure to at least about 10,500 L, or even at least about 10,800 L, or even at least about 12700 L. This was at least 4 times the failure volume passed of a conventional electrochemical apparatus. In addition, the advantage of dosing the water from the bleed line is that only one canister is required and the apparatus provides a longer drain life and membrane life.

For example, a system comprising a pair of canisters 115a,b that each contained sodium polyphosphate positioned adjacent to the first openings 146, 146a of ion exchange cell 102 and 102a provided a failure volume of about 12790 L. In another experiment, a bleed line system comprising a single canister 115 that contained sodium polyphosphate Siliphos II spheres positioned in the bleed line 129 provided a wide range of failure volumes ranging from 1671 to 4567 L. In still another experiment, a bleed line system comprising a single canister 115 that contained granulated Siliphos II spheres, positioned in the bleed line 129 also provided a wide range of failure volumes ranging from 1530 to 5948 L. In yet another experiment, a system comprising a pair of canisters 115a,b that each contained sodium polyphosphate Siliphos II spheres were positioned at the first openings 146 of ion exchange cells 102, 102a provided a failure volume of about 7700 L. In most of these systems, failure occurred due to valve clogging, and at the end of the lifetime, the apparatus 100 would not regenerate after every cycle.

In the bleed line and drain line systems, the range of water treatment volume to failure was large for any particular scale-inhibitor agent or CRSIC 200 because of the many different factors affecting scale accumulation and valve failure. One cause for the difference arose from using recycled (previously used) valves which although they were cleaned with hydrochloric acid prior to use, tended to get clogged earlier. Generally, lifetimes of even new valves decreased with multiple water treatment and regeneration cycles because, even though the valves were replaced, the rest of the unit still has growing scale crystals that can move through the system and attach to the valves. High duty cycle (1 water treatment cycle/50 minutes) and low duty cycle (1 water treatment cycle/2 hours) provided little difference in water treatment volume to failure due to valve or membrane failures.

In another version, an anti-scale electrochemical apparatus 100 having shaped forms of CRSIC 200 positioned in the housing 104, 104a, of one or more anti-scale ion exchange cells 102, 102a was fabricated and tested. The CRSIC 200 can be shaped as any suitable shape including, for example, a disc, net, rod, band or granule. The shaped forms of CRSIC 200 can be (i) positioned adjacent to the first electrode, (ii) attached to the cartridge 130 that contains a water-splitting membrane 110, (iii) attached to an end cap 138 of a cartridge 130 or to the housing 104, 104a of the cells 102, 102a, (iv) within the void volume of the cells 102, 102a, or (v) provided in a cell as a combination of different shapes and/or different positions. For example, one or more CRSIC bands 202 were placed over the netting 142 of a cartridge 130 so that the CRSIC bands 202 are wrapped around the cartridge 130 as shown in cell 102 of FIG. 1A. Alternatively, a CRSIC ring 204 shaped like a donut can be fitted onto the bottom of the housing 104, also as shown in cell 102 of FIG. 1A. As another example, CRSIC 200 shaped as a CRSIC band 202 or (or rod) can be attached to the end cap 138 of the cartridge 130 as shown cell 102 of FIG. 1A. In still another version, CRSIC granules 208 are positioned between the cartridge 130a and the housing 104a, as shown in cell 102a of FIG. 1A. Still other CRSIC shapes and arrangements are possible within the housing of the cell, as would be apparent to those of ordinary skill in the art, so the scope of the claims should not be limited to the exemplary versions described herein to illustrate features of the invention. Further, while FIG. 1A shows various applications of the CRSIC 200 in the cells 102, 102a or in canisters 115, 115a,b, it should be understood that any single one, or a combination of these configurations, can be used.

In these experiments, the CRSIC 200 was formed by mixing a scale-inhibitor agent comprising sodium polyphosphate with a matrix material comprising polyolefin. The concentration ratio of scale-inhibitor agent to matrix material was selected to provide a controlled-release scale inhibitor composite capable of slowly releasing the anti-scale compound as described above. The rate of dissolution of the scale-inhibitor agent can also be controlled by the thickness of the shaped forms of CRSIC 200, or the amount/volume of CRSIC 200 used in an electrochemical apparatus 100, or the hardness of the water. Thicker and narrower shaped forms of CRSIC 200 also create obstacles for diffusion, decreasing the diffusion rate of the scale-inhibitor agent in the water. By changing these parameters, along with the number of CRSIC 200 forms placed in a cell or canister, the amount of scale-inhibitor agent controllably released in the ion exchange cells 102, 102a can be controlled to a desired range of values. The amount of scale-inhibitor agent required can also be dependent upon the hardness of the water.

Figure 5:
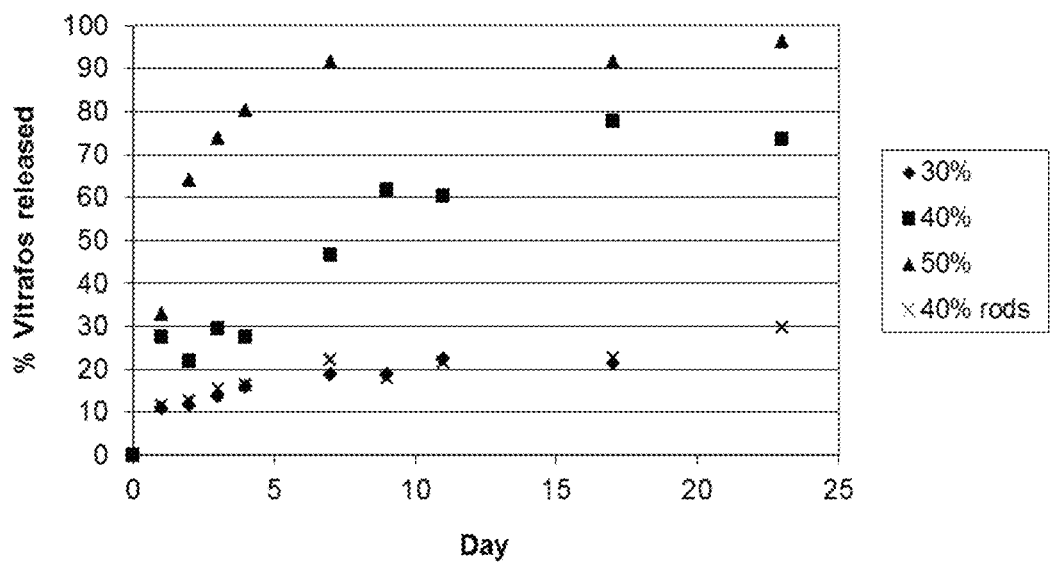
FIG. 5 is a graph showing the dissolution percentage of anti-scaling agent of sodium polyphosphate (Vitrafos™) released over time from CRSIC articles shaped as bands and rods and having varying concentration loading of anti-scale agent.

In one experiment, the rate of dissolution and resultant concentration levels of the scale-inhibitor agent in the water stream, for different concentration ratios of scale-inhibitor agent to matrix material in a CRSIC 200, was measured. In this experiment, CRSIC bands 202 were fabricated with scale-inhibitor agent concentrations of 30%, 40% and 50% by volume of sodium polyphosphate in a polyolefin. The CRSIC bands 202 were sized to have a thickness of from about 0.5 to about 20 mm, a width of from about 1 cm to about 10 cm, and length of from about 5 to about 25 cm. The CRSIC bands 202 can also be glued together with a hot glue gun or a soldering iron to increase their thickness. The CRSIC bands 202 were wrapped around a cartridge 130 of an ion-exchange cell 102 to form a version of the anti-scale electrochemical apparatus 100 shown in FIG. 1A. Positioning the CRSIC bands 202 near the outer surface of a cartridge 130 was equivalent to placing a source of scale-inhibitor agent in a canister 115 at the water inlet of an ion exchange cell 102. For example, 11 or 16 of the 40% concentration CRSIC bands 202 were mounted on a cartridge 130 of a single cell 102. In addition, CRSIC rods 206 with 40% by volume of scale-inhibitor agent were also placed in another ion exchange cell 102a, also as shown in FIG. 1A. Water having a total dissolved solids concentration of 600 ppm (1000 micro-S/cm conductivity) was passed through each of the anti-scale electrochemical apparatus. The CRSIC bands 202 and CRSIC rods 206 were weighed after drying over time to determine the mass of scale-inhibitor agent released from the bands over time. FIG. 5 shows the percentage of scale-inhibitor agent comprising Vitrafos™ released into a cell for the different scale-inhibitor agent concentrations. It is seen that the concentration of scale-inhibitor agent in the polymer matrix affects the percent dissolution rate, with the higher 50% concentration CRSCI bands 202 dissolving faster than the 40%, which in turn is faster than the 30% concentration bands. It is also seen that CRSIC rods 206 having a 40% concentration and a smaller ratio of surface area to volume compared to the bands 202, dissolved much slower than the 40% concentrations bands. The CRSIC rods 206 provide longer diffusion paths for escape of the scale-inhibitor agent into the water, thereby decreasing the dissolution rate.

The performance of an anti-scale electrochemical apparatus 100 comprising 11 or 16 CRSIC bands 202 having a 40% or 50% concentration of scale-inhibitor agent, and which were mounted on a cartridge 130 of a single cell 102 is provided in TABLE 1. It is seen that for systems testing more that one set of cartridges 130, 130a, the number of liters to failure for each subsequent set of cartridges decreases. This is because scale builds up on the system that allows for more proto-nuclei to be created and because the amount of Vitrafos being released is decreased as the cartridge cycles more and more.

TABLE 1

Treated Water Volume to Failure for Apparatus with CRSIC Bands in Cells

| Experiment | Liters to Failure | Comments |
| --- | --- | --- |
| Baseline (no scale inhibitor) | 2385, σ = 650 | Valves clogged |
| 50% loaded CRSIC bands (16) in a cell | 4959, 6890 (two different units) | Valves clogged |
| 40% loaded CRSIC bands (16) in a cell | 7320, 2204 (one system), 7005 (second system), 11,150 (third system) | Valves clogged |
| 40% loaded CRSIC bands (11) in a cell | 5003, 1617, 880 (one system), 7150, 2150, 1783 (second system) | Valves clogged |

Figure 6:
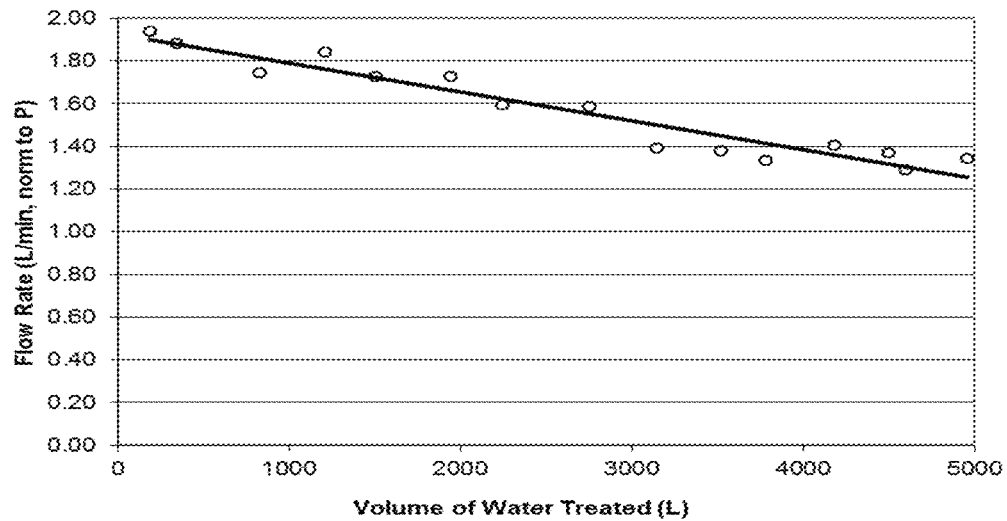
FIG. 6 is a graph showing the flow rate of water versus the volume of treated water passed through an anti-scaling electrochemical apparatus comprising a cartridge with (16) CRSIC bands that each have scale-inhibitor agent in a 50% concentration loading.
Figure 7:
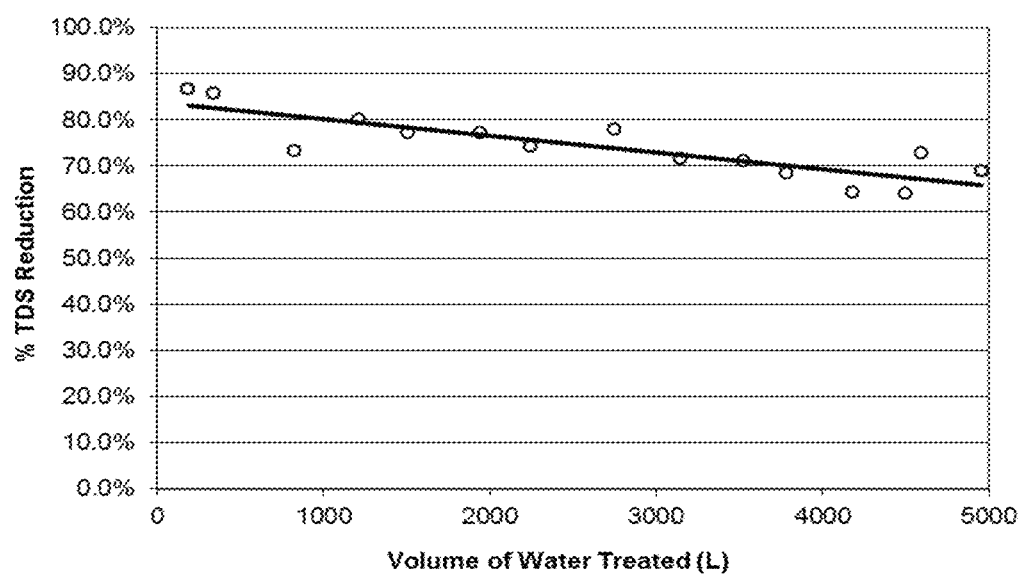
FIG. 7 is a graph showing the TDSR versus the volume of treated water passed through the anti-scaling electrochemical apparatus of FIG. 6 (a cartridge with (16) CRSIC bands that each have scale-inhibitor agent in a 50% concentration loading)

The normalized water flow rate and TDS reduction of the anti-scale electrochemical apparatus 100 with sixteen (16) of the 50% loaded CRSIC bands 202 in a cell 102 are shown in FIGS. 6 and 7, respectively (the first system in Table 1). During the 4959 liter test, there is a 30% flow rate reduction and TDS reduction drops from 82% to 68%; the test ended when the valves clogged. The 4959 liter to clogging of these drain valves is more than twice the average life without scale inhibitor (baseline data in Table 1). The failure of the valves at only about 5,000 liters, however, indicated that the scale-inhibitor agent was rapidly released and depleted quickly. Midway through this test, at about 2500 liters, there was no longer any available scale-inhibitor agent to further inhibit scale formation, so that the valves failed after a further 2500 liters (the baseline result in Table 1).

Figure 8:
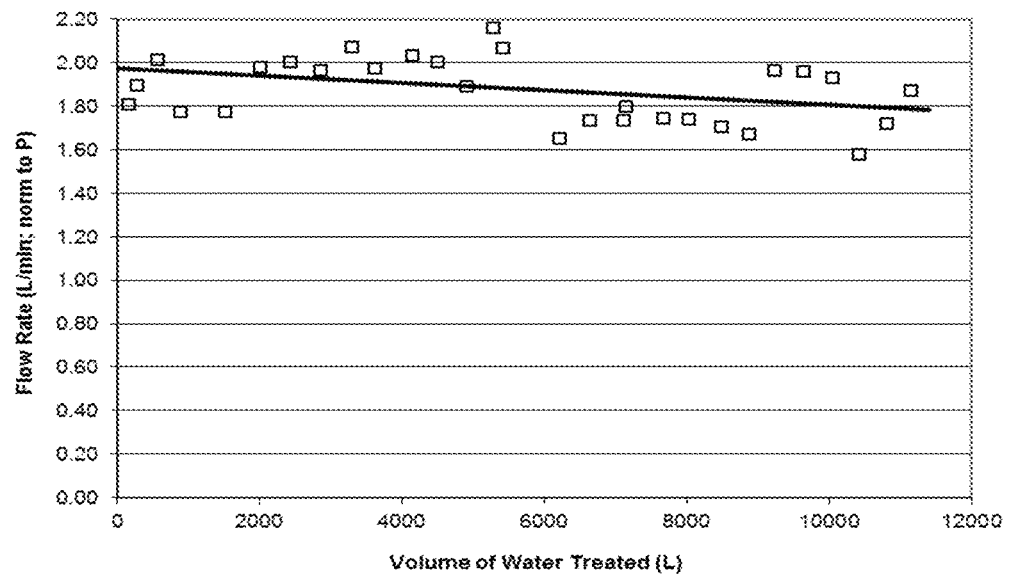
FIG. 8 is a graph showing the flow rate of water versus the volume of treated water passed through an anti-scaling electrochemical apparatus comprising a cartridge with (16) CRSIC bands that each have a lower scale-inhibitor agent comprising a 40% concentration loading.
Figure 9:
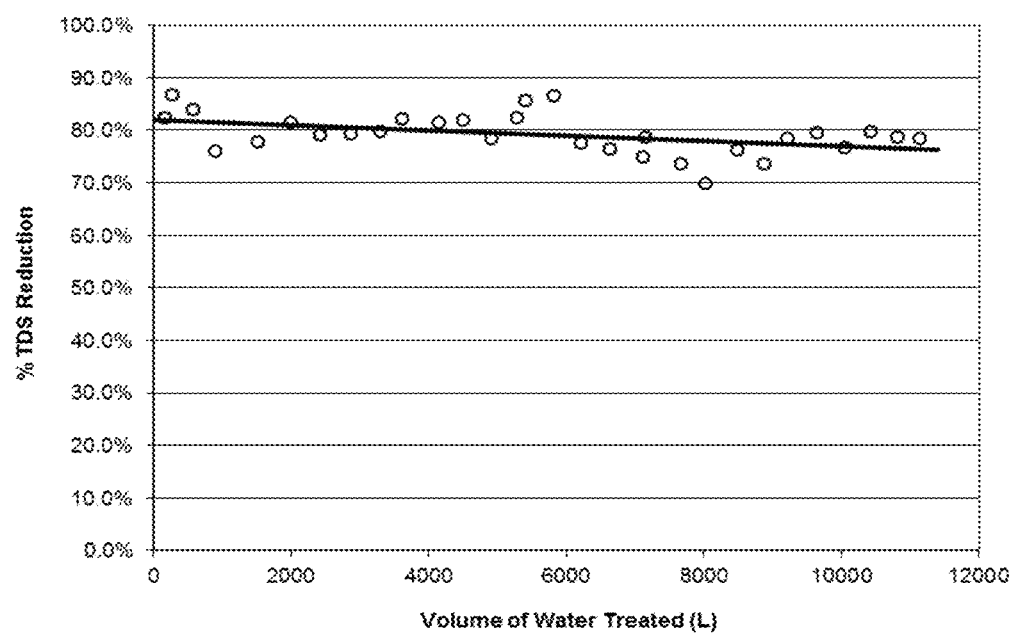
FIG. 9 is a graph showing the TDSR versus the volume of treated water passed through the anti-scaling electrochemi-cal apparatus of FIG. 8 (comprising a cartridge with (16) CRSIC bands that each have scale-inhibitor agent in a 40% concentration loading)
Figure 10:
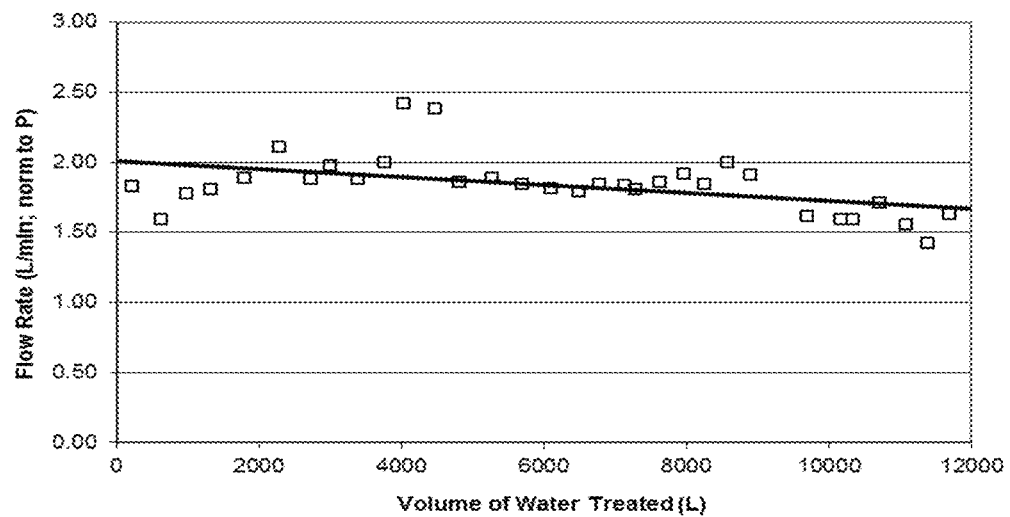
FIG. 10 is a graph showing the flow rate of water versus the volume of treated water passed through an anti-scaling electrochemical apparatus comprising a cartridge with eleven (11) CRSIC bands that each have scale-inhibitor agent in a 40% concentration loading.
Figure 11:
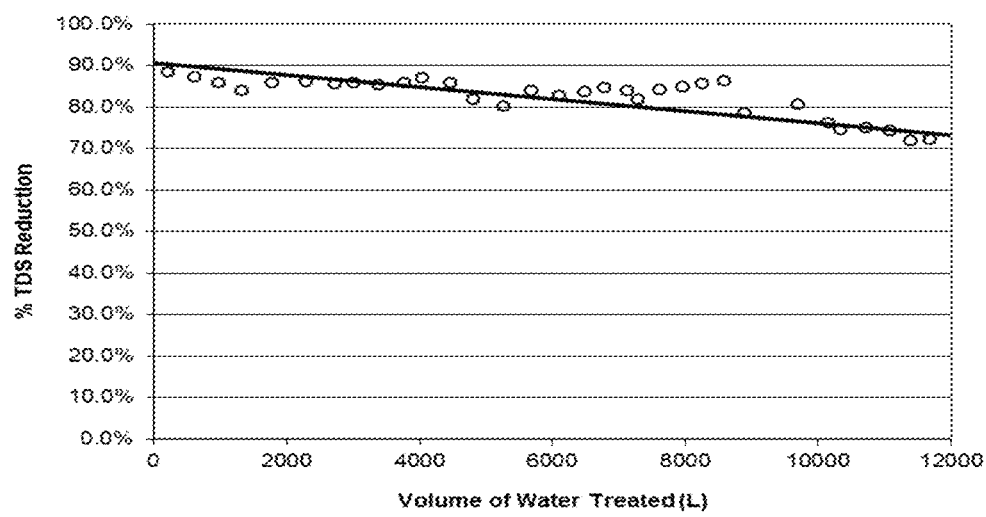
FIG. 11 is a graph showing the TDSR versus the volume of treated water passed through the anti-scaling electrochemical apparatus of FIG. 10 (comprising a cartridge with eleven (11) CRSIC bands that each have scale-inhibitor agent in a 40% concentration loading)

The normalized water flow rate and TDS reduction of the anti-scale electrochemical apparatus 100 (third system tested in Table 1) with sixteen (16) of the 40% loaded CRSIC bands 202 in a cell 102 are shown in FIGS. 8 and 9, respectively. The relatively stable flow rates and TDS reduction results to 11,150 liters, when the drain valves first clogged, resulted because the scale inhibitor dissolution continued well beyond the 5,000 liter life of the cartridges. Drain valves eventually clogged up at 11,150 liters in this example because the scale inhibitor is exhausted at about 2,500 liters earlier (at about 8,800 liters). This showed that the 40% loaded CRSIC bands 202 were more effective at reducing the scale buildup than are the 50% loaded bands. The 40% loaded CRSIC bands 202 also desirably provided only a 10% flow rate reduction over 11,150 liters of water production, and the TDS reduction decreases less than with 50% bands, from 82% to 78%. It is also seen in Table 1 that the number of liters to failure for each subsequent set of cartridges when using 16 CRSIC bands decreases. It is believed that this occurs because scale build-up in the system allows more rapid proto-nuclei creation when a second, or further set, of cartridges are installed in one system Still further increased dissolution lifetimes were expected for CRSIC bands 212 loaded with scale-inhibitor agent in a concentration of 37% by volume. Thus CRSIC bands 202 comprising scale-inhibitor agent in a concentration of 30 to 50% by volume extends the life of the electrochemical apparatus and the volume of treated water before failure to 10,000 L or even 15,000 L. In addition, scale inhibition was found to extend the life of a cell 102 such that there is a less than 30% drop in flow rate even after treatment of about 5000 L of water.

In yet another version, the controlled-release scale-inhibitor article 198 was formed by incorporating a scale-inhibitor agent into an ion exchange formulation, which can be an anion or cation exchange formulation, to form an anti-scale, water-splitting membrane 110a, a version of which is illustrated in cell 102a of FIG. 1A and in FIG. 1C. Forming the anion or cation exchange layer of the membrane 110a with incorporated scale-inhibitor agent can reduce the footprint of an ion exchange cell 102a by providing both anti-scale and ion exchange attributes in a single membrane structure. In this version, the anti-scale, water-splitting membrane 110a is formed by mixing together (i) anion or cation ion exchange formulation, (ii) scale-inhibitor agent, and (iii) matrix material. Because the membrane 110a has two layers including an anion exchange layer 152a and a cation exchange layer 150a, only one layer needs to include the scale-inhibitor agent, however, both layers can also incorporate the scale-inhibitor agent. The resultant formulation is extruded or pressure-formed into the desired shape of the anti-scale, anion and cation exchange layers 150a, 152a, respectively, which are joined together to form a water-splitting interface 156 therebetween at their joint interface. The anti-scale, water splitting membrane 110a can be textured with a pattern of repeating textured features having dimensions on the order of microns, such as arrays of peaks and valleys, or even an array of furrows and ridges that are linearly spaced apart and parallel to a flow path of the influent water stream 124 passing through the cell 102.

In one version, the anti-scale, water-splitting membrane 110a comprises a concentration ratio of scale-inhibitor agent to matrix material, such as a polymer, that is sufficient or sufficiently high to provide scale inhibition over treatment of the entire volume of water that can be processed by the water-splitting membrane 110a before the membrane needs to be replaced, which is typically at least 2500 L of water, or even at least about 5000 L of water, or even at least about 10,000 L of water. For example, the loading of scale-inhibitor agent in the ion exchange membrane material (polymer matrix plus ion exchange material) is selected to provide at least an average of about 0.5 ppm of scale-inhibitor agent in a regenerant water stream that is generated during cell regeneration over treatment of the entire volume of water that can be processed by the membrane 110a before the membrane needs to be replaced. The concentration of scale-inhibitor agent in ion exchange membrane material can also be sufficiently high to dissolve at least about 25% by volume of the scale-inhibitor over treatment of the entire volume of water that can be processed by the membrane 110a before the membrane needs to be replaced. A suitable concentration of scale-inhibitor agent to polymer that achieves the desired results over the usable lifetime of the anti-scale, water-splitting membrane 110a was determined to be at least about 5 volume percent, or even at least about 10 volume percent, or even at least about 25 volume percent. As an example, the membrane 110a can comprise scale-inhibitor agent in the amount of from about 5% by volume to about 40% by volume, and the ion exchange membrane material in the amount from about 95% by volume to about 60% by volume.

In one version, a scale-inhibitor agent was mixed with an anion exchange formulation to form an anti-scale anion exchange layer 152a of anti-scale, water-splitting membrane 110a, as shown in FIGS. 1C and 13. This was done because higher scale accumulation was found in the anion exchange layer 152 in water treatment tests. However, the cation exchange formulation can also be mixed with a scale-inhibitor agent and matrix to form an anti-scale, cation exchange layer, or two anti-scale layers can be formed, one containing the anion exchange formulation and the other containing the cation exchange formulation.

In one example, the anti-scale anion exchange layer 152a was formed by mixing (i) an anion formulation comprising —NR$_3$A groups such as trimethyl (—NCH$_3$) or triethyl ammonium (—N(C$_2$H$_5$)$_3$ groups), (ii) a polymer matrix such as a polyolefin, and (iii) a scale-inhibitor agent such as sodium polyphosphate. For example, a formulation suitable to form an anion exchange layer 152a was made by mixing (i) a powdered anion exchange resin comprising triethyl ammonium, (ii) a matrix material comprising polyolefin, and (iii) a scale-inhibitor agent comprising sodium polyphosphate in a concentration of 10% by volume. The sodium polyphosphate was Vitrafos™ powder sieved through a 100 mesh screen prior to mixing. The resultant mixture was co-extruded with a formulation suitable for forming a cation exchange layer, such as a cation exchange resin formulation comprising a weak acid cation exchange resin to form a the anti-scale water-splitting membrane 110a. A single or a plurality of membranes 110a are spiral wound and bound together to form a spiral roll that defines a cartridge 130a. The cartridge 130a was then placed in the cell 102a of the electrochemical apparatus 100 of FIG. 1A. The electrochemical apparatus 100 comprising the ion exchange cell 102a with the anti-scale water-splitting membrane 110a containing an anti-scale anion exchange layer 152a was found to be able to treat twice the baseline water volume processed by a conventional electrochemical apparatus without failure.

Figure 3:
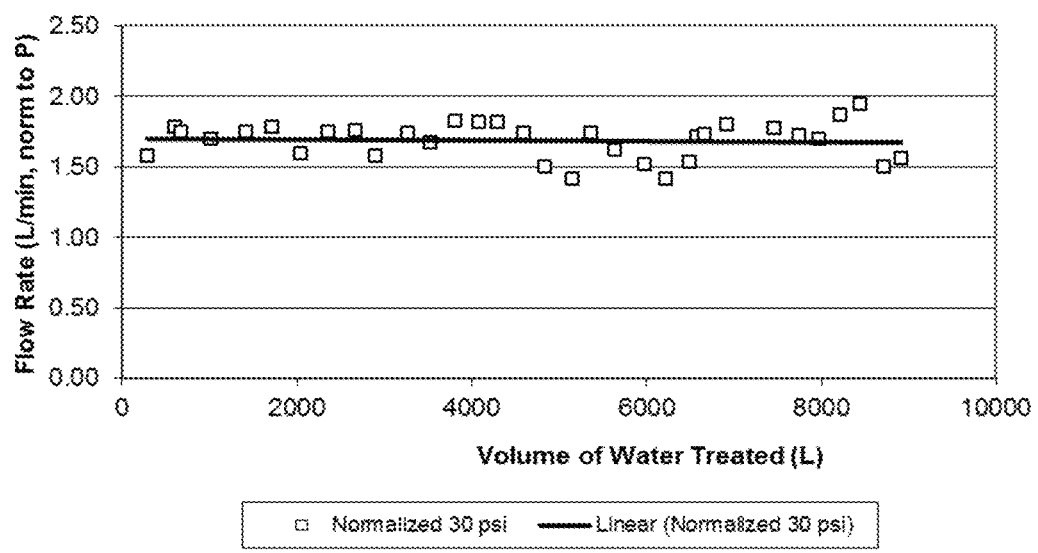
FIG. 3 is a graph showing the flow rate of water versus the volume of treated water passed through an anti-scaling electrochemical apparatus comprising a cartridge with an anti-scale, water-splitting, ion exchange membrane comprising an anion exchange layer containing scale-inhibitor agent in a matrix.
Figure 4:
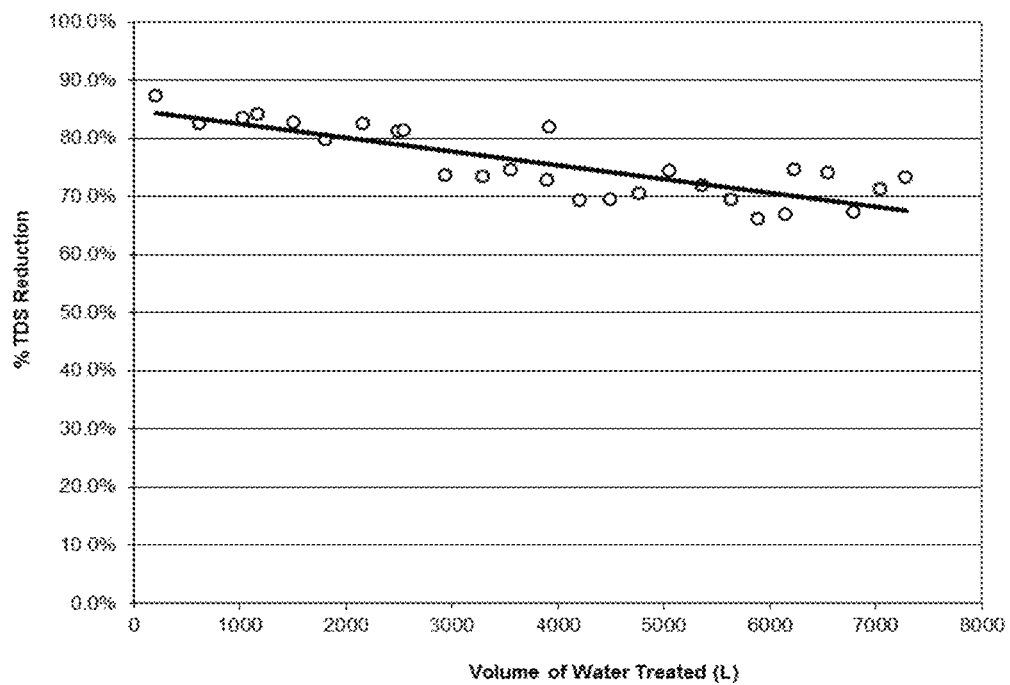
FIG. 4 is a graph showing the total dissolved solids reduction (TDSR) versus the volume of water treated by passing water through an anti-scaling electrochemical apparatus comprising a cartridge with an anti-scale, water-splitting, ion exchange membrane having an anion exchange layer with scale-inhibitor agent.

The anti-scale, water-splitting membrane 110a containing an anti-scale anion exchange layer 152a with embedded scale inhibitor was found to also increase membrane life as seen by the constant flow rate shown in FIG. 3. The TDS reduction of these ion exchange membranes is similar to that of membranes produced without scale inhibitor, as shown in FIG. 4. An anti-scale electrochemical apparatus 100 having this configuration processed 5788 L of input water, before the solenoid valves of the valve system 118 became clogged with scale. Thus an anti-scale water-splitting membrane 110a comprising an anti-scale anion exchange layer 152a containing scale-inhibitor agent, processed more than about 2 times as much water before failure as the baseline water volume processed by the baseline conventional electrochemical apparatus without scale inhibitor.

An exemplary embodiment of an anti-scale electrochemical apparatus 100 comprising an ion exchange cell 102 which includes a housing 104 having a sidewall 132 which encloses a cartridge 130 is shown in FIG. 12. While an illustrative cell 102 and its related control system is shown, other components can be added without deviating from the scope of the present invention. For example, other devices 177a,b can also be placed in the water pathway of the apparatus 100, such as for example, sediment filters, carbon filters, UV filters, anti-microbial filters, and still other devices. Alternative devices 177a,b can include additional valves or sensors, such as hardness sensors, pressure sensors, and other water monitoring sensors.

The housing 104 has a first opening 146 for introducing an influent water stream 124 into the cell and a second opening 148 for releasing an effluent water stream 125, as shown in FIGS. 12 and 13. The cartridge 130 comprises a plurality of water-splitting membranes 110 as shown in FIG. 12, or anti-scale water-splitting membranes 110a as shown in FIG. 13, which are rolled onto a core tube 134 (such as a tube of rigid netting material) covered by a netting 142 and closed off with end caps 138a,b mounted on either end of the core tube 134. The cartridge 130 provides a high packing efficiency of membranes 110, allows easy replacement or cleaning of membranes by changing the cartridge 130, and also provides a radially inner-to-outer flow direction across the membranes 110 to provide a fluid passageway 144 that is connected in an unbroken sequence that extends continuously from the first opening 146 to the second opening 148 to allow the influent water stream 124 to flow through and across the membranes 110, 110a. For example, three or more membranes 110, 110a can be spiral wrapped around the porous tube 141 to form a parallel flow arrangement in which fluid flows from the cell inlet to the second opening 148 in three equivalent passageways that lie between the membranes 110, 110a. The membranes 110, 110a can be spiral wrapped with or without the spacers 154 between the external surfaces of the cation or anion exchange layer 150,152 (see FIG. 13). The spacers 154 can be made from a fibrous dielectric material, such as a polymer, for example, polyethylene or polypropylene, and have a thickness of from about 0.01 to about 5 mm, or more typically about 0.1 mm.

The membranes 110, 110a lie between the outer and inner electrodes 106, 108. The cation exchange layer 150 faces the outer electrode 106 and the anion exchange layer 152 or the anti-scale anion exchange layer 152a faces the inner electrode 108. In this version, during deionization water enters the first opening 146 at the outer circumference of the cell 102, which is adjacent to the outer electrode 106. For example, the outer electrode 106 can be a wire wrap outside the cartridge 130 and adjacent to an inner wall of the housing 104, and the inner electrode 108 can be a wire spiral wrapped on the core tube 134 in the center of the cartridge 130. The electrodes 106,108 of the cell 102 are fabricated from electrically conductive materials, such as a metal or metal alloy, which are resistant to corrosion in the low or high pH chemical environments formed during the positive and negative polarization of the electrodes 106,108, in operation of the cell 102. Suitable electrodes 106,108 can be fabricated from corrosion-resistant materials such as titanium or niobium, and can have an outer coating of a noble metal, such as platinum. The shape of the electrodes 106,108 depends upon the design of the ion exchange cell 102 and the conductivity of the influent water stream 124 flowing through the cell 102. Suitable shapes for the electrodes 106,108 include for example, wires, wire mesh wraps, sheets with punched holes, concentric spheres, parallel plates, tubular wire meshes, discs, or even conical shapes. The electrodes 106,108 are arranged to provide an electric potential drop through the membranes 110 upon application of a current to the electrodes 106,108.

Each membrane 110 and 110a is a bipolar, double, laminar, ion exchange membrane consisting of a cation exchange layer 150 and an anion exchange layer 152 or anti-scale anion exchange layer 152a, which contact one another to form a water-splitting interface 156. The cation exchange layers 150, and anion exchange layers 152, 152a, contain cation and anion exchange materials, respectively, in the form of solids or gels containing ions which are replaceable by, or which chemically react with, other ions to remove the other ions from the influent water stream 124. For example, suitable cation and anion exchange materials can include crosslinked or un-crosslinked organic polymers or inorganic structures such as zeolites. Suitable cation exchange materials comprise acidic functional groups capable of exchanging cations without a permanent change to their structure, such as —COOM, —$SO_3M$, —$PO_3M_2$, and —$C_6H_4OM$, where M is a cation (e.g., hydrogen, sodium, calcium, or copper ion). Cation exchange materials also include those comprising neutral groups or ligands that bind cations through coordinate rather than electrostatic or ionic bonds (for example, pyridine, phosphine and sulfide groups), and groups comprising complex forming or chelating groups (e.g., those derived from aminophosphoric acid, aminocarboxylic acid and hydroxamic acid. Anion exchange materials exchange anions without a permanent change to their structure, and can be, for example, basic functional groups capable of exchanging anions such as —$NR_3A$, —$NR_2HA$, —$PR_3RA$, —$SR_2A$, or $C_5H_5NHA$ (pyridine), where R is an alkyl, aryl or other organic group and A is an anion (e.g., hydroxide, bicarbonate, chloride, or sulfate ion).

The selection of suitable cation and anion exchange materials for a water-splitting membrane 110 depends on the application of the membrane 110. For the deionization of water, a water-splitting membrane 110 comprising a cation exchange layers 150 comprising —$SO_3M$ or carboxylic acid (—COOH) groups, and an anion exchange layer 152 comprising —$NR_3A$ groups such as trimethyl (—$NCH_3$) or triethyl ammonium (—$N(C_2H_5)_3$ groups), can be used. Such membranes 110 readily swell in water, thereby providing lower electrical resistances and higher mass transport rates over a wide range of pH. Anion exchange materials comprising weak base or weak acid groups are preferred when particularly efficient ion exchange regeneration is required. For example, —$NR_2HA$ will react with $OH^-$ in a very favorable reaction to form —$NR_2$, $H_2O$, and expel $A^-$. As another example, for the selective removal of calcium or copper ions from a liquid containing other ions, for example sodium ion, ion exchange groups such as —COOM or a chelating group, such as amino-carboxylic acid, are preferred. These weak acid groups offer the additional benefit of particularly efficient regeneration due to the strongly favorable reaction of —(COO)$_n$M with H$^+$ to form —COOH and expel M$^{+n}$, where M is a metal ion.

The ion exchange cell 102 shown in FIG. 12 comprises CRSIC 200 in the form of CRSIC bands 202 mounted on the cartridge 130. The CRSIC 200 can be preferably positioned in the housing 104 to be adjacent to the outer electrode 106. The outer electrode 106 is near the first opening 146 during a deionization water treatment cycle, which serves as the regeneration effluent water stream outlet during a regeneration cycle because the water flow path into the cell 102 is reversed during regeneration. The water-splitting membranes 110 absorb a large amount of the scale-inhibitor agent as it passes between the membrane layers during deionization, and thus, during regeneration this absorbed scale-inhibitor agent is rejected into the regeneration effluent water stream which passes down the drain valve 113 and drain line 112 where it serves to inhibit scale formation thereby preventing or reducing clogging at these components. In one version, the CRSIC bands 202 are spaced apart, and attached over the netting 142 to allow replacement of the entire cartridge 130, when both the membranes 110 and the CRSIC bands 202 need to be replaced.

The ion exchange cell 102 shown in FIG. 13 comprises one or more anti-scale water-splitting membranes 110a, which each contain an anti-scale anion exchange layer 152a and a cation exchange layer 150. The anti-scale anion exchange layer 152a comprises scale-inhibitor agent mixed into an anion exchange formulation and a matrix material. A plurality of anti-scale water-splitting membranes 110a are offset from one another and wound in spiral pattern around the core tube 134. Netting 142 is attached over membranes 110a to hold the membranes together, and then the end caps 138a (and 138b which is shown in FIG. 12) are attached to form the cartridge 130. Advantageously, this arrangement also allows replacement of the entire cartridge 130, when the anti-scale water-splitting membranes 110a need to be replaced.

A controller 170 controls the operation of the apparatus 100 and supplies control signals and power applied to the various components of the apparatus 100 via the electrical lines 174 including the power supply 114, drain valve 113, valve system 118, flow sensor 160, and devices 177a,b. For example, the controller 170 controls the polarity selector of the power supply 114 to set the polarity of the voltage applied to the electrodes 106, 108 of the cells 102 to operate the cells 102 in water treatment mode or regeneration mode. The controller 170 also receives a flow rate signal from a flow sensor 160 to determine the flow rate of fluid passing through the lines and cells 102, and can use the flow rate signal to control the power supplies 114 to adjust the electrical power applied to the electrodes 106, 108 of the cells 102 to provide the desired level of ion extraction or microorganism deactivation, or to adjust the voltage power applied to the electrodes in relation to the direction and rate of flow fluid through the cells 102. The controller 170 also operates the valve system 118 by sending a signal to each solenoid valve 119a-d and the drain valve 113 (as shown in FIG. 1A) to move their internal movable elements from a first to a second position, or other positions so that the valve system 118 directs the passage of an influent water stream 124 to any one of the cells 102; from the cells 102 to a drain 190; or from one cell 102 to the other cell 102a or vice versa. The valve system 118 can also be used to pass the fluid to other fluid treatment apparatus as would be apparent to one of ordinary skill in the art.

The controller 170 comprises a control module that includes a microcontroller capable of generating and receiving signals and instructions to individually and collectively operate components of the ion exchange apparatus 100. For example, the control module can comprise (i) a programmable integrated circuit chip or a central processing unit, CPU (not shown), (ii) a memory (not shown) such as a random access memory and stored memory, (iii) peripheral input and output devices (not shown) such as keyboards and displays, and (iv) hardware interface boards (not shown) comprising analog, digital input and output boards, and communication boards. The control module can also comprise program code instructions stored in the memory that are capable of controlling and monitoring the ion exchange cells 102, 102a, power supply 114 and other components of the apparatus 100. The program code may be written in any conventional computer programming language. Suitable program code is entered into single or multiple files using a conventional text editor and stored or embodied in the memory. If the entered code text is in a high level language, the code is compiled, and the resultant compiler code is then linked with an object code of pre-compiled library routines. To execute the linked, compiled object code, the user invokes the object code, causing the CPU to read and execute the code to perform the tasks identified in the program. In one version, the microcontroller is a single integrated device that comprises a CPU, memory, program code, input and output circuitry, and other circuitry that may be specialized or adapted to particular tasks. A suitable microcontrollers is a PICmicro® series of microcontroller, such as for example the 28/40-Pin 8-Bit CMOS Flash PIC16F87X Microcontroller, available from Microchip located in Chandler, Ariz. Another example of a suitable commercially available microcontroller is the 68000 available from Motorola Corp., Phoenix, Ariz.

The power supply 114 is capable of generating voltages to deliver power to components of the apparatus 100. The voltage levels generated by the power supply 114 are selected depending upon, for example, the component requirements, the operating conditions of the apparatus 100, or other factors. The power supply 114 converts AC voltage source into a DC voltage output suitable for the electrodes 106, 108, for example, a pulsating DC voltage having a selectable voltage level in the range of from about 0 V to about 330 V, or from about 30 volts to 300 volts. The DC voltage has a ripple value of from about 10% to about 50% of the time-averaged value of the DC voltage during a specified time period. The polarity of the voltage applied to the electrodes 106, 108 depends on their operation, with one polarity applied during water treatment and a reverse polarity applied during cell regeneration. A suitable power supply 114 comprises, for example, a DC voltage supply capable of rectifying and multiplying the AC input voltage, a voltage level selector with timing circuitry, a current detector, and a polarity selector. The power supply 114 is controlled by a controller 170 capable of interpreting sensor information and outputting appropriate command signals to the voltage level and polarity selectors.

The apparatus 100 shown in FIG. 1A comprises cells 102, 102a which can operate in one of two modes which can include a water treatment (or water deionization) mode and a cell regeneration mode. Advantageously, the first ion exchange cell 102 can be used to treat water flowing therethrough, while the second ion exchange cell 102*a* is being regenerated, and vice versa, to allow the apparatus 100 to operate continuously. During operation of cell 102 in water treatment mode, valve 119*a* is open, valve 119*b* is shutoff, valve 119*c* is shutoff, and valve 119*d* is open to cause water to flow from the valve 119*a* and into first opening 146 of cell 102. The influent water stream 124 is passed into the cell 102 from the first opening 146 at the outer periphery of the cell, to pass from the outside to the inside of the housing 104, past the outer electrode 106, past the controlled-release scale-inhibitor article 198, and through the layers of the membrane 110 (or membrane 110*a* when the same is in cell 102), into the top of core tube 134, to exit at the second opening 148 at the bottom of the cell 102. The drain valve 113 is shutoff to block the flow of fluid to the drain 190. Voltage is applied between the electrodes 106,108 of cell 102 and the electric potential drop across the membranes 110 or 110*a* causes the water to be irreversibly dissociated or "split" into component ions H+ and OH− at the water-splitting interface 156 between the cation and anion exchange layers 150 and 152, 152*a* of each membrane 110, 110*a*. The electric potential applied results in ions being exchanged into and out of the membranes 110, 110*a* as the water passes through the membranes 110 treating the water.

Regeneration rinses the membranes 110, 110*a* of the cells 102, 102*a* of exchange ions and other impurities and recharges the cells for future water treatment. For example, during membrane regeneration, water is passed in the opposite direction, namely from the second opening 148 at the bottom of the cell 102, through the core tube 134 to its top, past the inner electrode 108, and then across the membrane layers from the inside to the outside of the housing 104 to exit as a waste stream at the first opening 146, past the open valve 119*b* and through the drain valve 113 to the drain 190. During regeneration, treated deionized water from the treated water tank 126 is used to regenerate the cell 102 because the deionized water typically has a conductivity which is less than 50% that of the untreated water, and as such, regenerates the cell better than untreated water which has higher dissolved ion content. During regeneration, a reverse polarity voltage (a first positive polarity to the outer electrode 106) is applied to the electrodes 106,108 of the cell 102 causing H+ and OH− ions to be formed at the water-splitting interface 156 causing rejection of cations and anions which were removed in a previous deionization cycle, and thus, reforming the acid and base forms of the cation and anion exchange materials of the membranes 110, 110*a*. Similarly, cell 102*a* can also be used to treat water simultaneously, or be regenerated during water treatments in cell 102, by suitably opening and closing off the valves 119*a-d* of the valve system 118 and the drain valve 113 in the desired sequence.

The present invention has been described with reference to certain preferred versions thereof; however, other versions are possible. For example, the apparatus and methods can be used in other applications, as would be apparent to one of ordinary skill, such as for example, for removing other materials from water, or cleansing industrial solutions and waste slurries. Other compositions and shapes of the controlled-release scale inhibitor article 198, different configurations of the apparatus 100, different ways of interconnecting the ion exchange cells 102, 102*a*, alternative valve systems 118, and different types of membranes 110, can also be used. Therefore, the spirit and scope of the appended claims should not be limited to the description of the preferred versions contained herein.

What is claimed is:

1. An ion exchange cell comprising:
   (a) a housing having a plurality of openings to receive and release a water stream;
   (b) inner and outer electrodes in the housing;
   (c) a water-splitting membrane between the inner and outer electrodes to treat an influent water stream to form an effluent water stream; and
   (d) a controlled-release scale-inhibitor composite in the housing, the controlled-release scale-inhibitor composite comprising a concentration ratio of a scale-inhibitor agent to a thermoplastic polymer that is sufficiently high to provide an average concentration of at least about 0.5 ppm of the scale-inhibitor agent in a regenerant water stream that is generated during cell regeneration over treatment of the entire volume of water that can be processed by the water-splitting membrane before the water-splitting membrane needs to be replaced.

2. A cell according to claim 1 wherein the controlled-release scale-inhibitor composite comprises a concentration ratio of scale-inhibitor agent to thermoplastic polymer that is sufficiently high to dissolve at least about 25% of the scale-inhibitor agent over treatment of the entire volume of water that can be processed by the water-splitting membrane before the water-splitting membrane needs to be replaced.

3. A cell according to claim 1 wherein the controlled-release scale-inhibitor composite comprises a concentration ratio of the scale-inhibitor agent to the thermoplastic polymer of from about 20% by volume to about 60% by volume.

4. A cell according to claim 1 wherein the scale-inhibitor agent comprises sodium polyphosphate.

5. A cell according to claim 1 wherein the controlled-release scale-inhibitor composite is shaped as a disc, net, rod, band or granule.

6. A cell according to claim 1 wherein the water-splitting membrane is spiral wound to form a cartridge, and the controlled-release scale-inhibitor composite is attached to the cartridge.

7. A cell according to claim 1 wherein the controlled-release scale-inhibitor composite is located adjacent to the outer electrode.

8. A cell according to claim 1 wherein the controlled-release scale-inhibitor composite comprises a surface barrier.

9. An anti-scale electrochemical apparatus comprising:
   (a) a plurality of ion exchange cells according to claim 1, the ion exchange cells connected to one another to allow regeneration of one ion exchange cell while another ion exchange cell is used to treat water;
   (b) a power supply to apply a current to the inner and outer electrodes of each ion exchange cell; and
   (c) a valve system to control a flow of water between the ion exchange cells for water treatment or regeneration.

10. A method of fabricating an anti-scale electrochemical apparatus, the apparatus comprising an ion exchange cell having a housing enclosing a water-splitting membrane between inner and outer electrodes, the method comprising:
   (a) forming a controlled-release scale-inhibitor composite comprising a scale-inhibitor agent and a thermoplastic polymer such that a concentration ratio of the scale-inhibitor agent to the thermoplastic polymer is sufficiently high to provide an average concentration of at least about 0.5 ppm of the scale-inhibitor agent in a regenerant water stream that is generated during cell regeneration over treatment of the entire volume of water that can be processed by the water-splitting membrane before the water-splitting membrane needs to be replaced;
(b) providing the ion exchange cell comprising the housing enclosing the water-splitting membrane between the inner and outer electrodes, the cell having a water flow pathway; and
(c) providing the controlled-release scale-inhibitor composite in the water flow pathway of the ion exchange cell.

11. A method according to claim 10 comprising shaping the controlled-release scale-inhibitor composite by pressure forming.

12. A method according to claim 10 comprising positioning the controlled-release scale-inhibitor composite adjacent to the outer electrode in the housing.

13. An anti-scale water-splitting membrane comprises a water-splitting interface formed by contact of (i) an anion exchange layer and ii) a cation exchange layer, wherein either the anion exchange layer or the cation exchange layer comprises a scale-inhibitor agent in a concentration that is sufficiently high to provide an average concentration of at least about 0.5 ppm of the scale-inhibitor agent in a regenerant water stream that is generated during cell regeneration over treatment of the entire volume of water that can be processed by the anti-scale water-splitting membrane before the anti-scale water-splitting membrane needs to be replaced.

14. A membrane according to claim 13 wherein the anion exchange layer comprises the scale-inhibitor agent.

15. A membrane according to claim 13 wherein the scale-inhibitor agent comprises sodium polyphosphate, and wherein the anion exchange layer further comprises a thermoplastic polymer.

16. An ion exchange cell comprising:
(a) a housing having a plurality of openings to receive and release a water stream;
(b) inner and outer electrodes in the housing; and
(c) an anti-scale water-splitting membrane according to claim 13.

17. An apparatus according to claim 1 wherein the water-splitting membrane is replaced before the membrane exhibits water channeling.

18. An apparatus according to claim 1 wherein the water-splitting membrane is replaced before the membrane exhibits at least one of (i) a reduction in deionization performance of at least 10%, or (ii) a decrease in flow rate through the membrane of at least 30%.

19. An apparatus according to claim 1 wherein the thermoplastic polymer comprises a polyolefin.

20. An anti-scale electrochemical apparatus comprising:
(a) a plurality of ion exchange cells, each ion exchange cell comprising:
(i) a housing having a plurality of openings to receive and release a water stream;
(ii) inner and outer electrodes in the housing;
(iii) a water-splitting membrane between the inner and outer electrodes to treat an influent water stream to form an effluent water stream; and
(b) a power supply to apply a current to the inner and outer electrodes of each ion exchange cell;
(c) a valve system to control a flow of water between the ion exchange cells for water treatment or regeneration; and
(d) a canister in a water flow pathway of the ion exchange cells or valve system, the canister comprising a controlled-release scale-inhibitor composite, the controlled-release scale-inhibitor composite comprising a concentration ratio of a scale-inhibitor agent to a thermoplastic polymer that is sufficiently high to provide an average concentration of at least about 0.5 ppm of the scale-inhibitor agent in a regenerant water stream that is generated during cell regeneration over treatment of the entire volume of water that can be processed by the water-splitting membrane before the water-splitting membrane needs to be replaced.

21. An apparatus according to claim 20 wherein the controlled-release scale-inhibitor composite comprises a concentration ratio of the scale-inhibitor agent to the thermoplastic polymer of from about 20% by volume to about 60% by volume.

22. An apparatus according to claim 20 wherein the controlled-release scale-inhibitor composite comprises a thermoplastic polymer comprising a polyolefin.

23. An apparatus according to claim 20 wherein the water-splitting membrane is replaced before the membrane exhibits water channeling.

24. A membrane according to claim 13 comprising a concentration ratio of the scale-inhibitor agent to a thermoplastic polymer of from about 20% by volume to about 60% by volume.

25. A membrane according to claim 24 wherein the thermoplastic polymer comprises a polyolefin.

26. A membrane according to claim 13 wherein the anti-scale water-splitting membrane is replaced before the membrane exhibits water channeling.

27. A cartridge comprising an anti-scale water-splitting membrane according to claim 13, the membrane being spiral wound.

* * * * *